United States Patent
Yang et al.

(10) Patent No.: US 11,893,087 B2
(45) Date of Patent: Feb. 6, 2024

(54) DEFENDING MULTIMODAL FUSION MODELS AGAINST SINGLE-SOURCE ADVERSARIES

(71) Applicant: Robert Bosch GmbH, Stuttgart (DE)

(72) Inventors: Karren Yang, Medford, PA (US); Wan-Yi Lin, Wexford, PA (US); Manash Pratim, Pittsburgh, PA (US); Filipe J. Cabrita Condessa, Pittsburgh, PA (US); Jeremy Kolter, Pittsburgh, PA (US)

(73) Assignee: Robert Bosch GmbH

( * ) Notice: Subject to any disclaimer, the term of this patent is extended or adjusted under 35 U.S.C. 154(b) by 199 days.

(21) Appl. No.: 17/349,665

(22) Filed: Jun. 16, 2021

(65) Prior Publication Data
US 2022/0405537 A1    Dec. 22, 2022

(51) Int. Cl.
*G06K 9/00* (2022.01)
*G06F 18/25* (2023.01)
*G06N 3/08* (2023.01)
*G06T 7/246* (2017.01)
*G06V 20/56* (2022.01)

(52) U.S. Cl.
CPC .......... *G06F 18/256* (2023.01); *G06F 18/253* (2023.01); *G06N 3/08* (2013.01); *G06T 7/246* (2017.01); *G06T 2207/20084* (2013.01); *G06T 2207/30248* (2013.01); *G06V 20/56* (2022.01)

(58) Field of Classification Search
CPC ....... G06F 18/256; G06F 18/253; G06N 3/08; G06T 7/246; G06T 2207/20084; G06T 2207/30248; G06V 20/56
See application file for complete search history.

(56) References Cited

U.S. PATENT DOCUMENTS

| | | | |
|---|---|---|---|
| 2015/0269438 A1* | 9/2015 | Samarasekera | G01C 21/3852 382/154 |
| 2017/0193208 A1* | 7/2017 | Ashley | G06F 21/32 |
| 2018/0240017 A1* | 8/2018 | Huszar | G06N 3/045 |
| 2019/0042894 A1* | 2/2019 | Anderson | G06V 10/811 |

(Continued)

OTHER PUBLICATIONS

Kim et al. "Robust Deep Multi-modal Learning Based on Gated Information Fusion Network", Asian Conference on Computer Vision, Dated Nov. 2, 2018, 16 Pages.

(Continued)

*Primary Examiner* — Dhaval V Patel
(74) *Attorney, Agent, or Firm* — Dickinson Wright PLLC

(57) ABSTRACT

A multimodal perception system for an autonomous vehicle includes a first sensor that is one of a video, RADAR, LIDAR, or ultrasound sensor, and a controller. The controller may be configured to, receive a first signal from a first sensor, a second signal from a second sensor, and a third signal from a third sensor, extract a first feature vector from the first signal, extract a second feature vector from the second signal, extract a third feature vector from the third signal, determine an odd-one-out vector from the first, second, and third feature vectors via an odd-one-out network of a machine learning network, based on inconsistent modality prediction, fuse the first, second, and third feature vectors and odd-one-out vector into a fused feature vector, output the fused feature vector, and control the autonomous vehicle based on the fused feature vector.

20 Claims, 13 Drawing Sheets

(56) References Cited

U.S. PATENT DOCUMENTS

2019/0354797 A1* 11/2019 Nesta .................. G06V 10/764
2020/0081450 A1* 3/2020 Creusot .............. G08G 1/09623

OTHER PUBLICATIONS

Kim et al. "On Single Source Robustness in Deep Fusion Models", Advances in Neural Information Processing Systems, Dated Oct. 16, 2019, 19 Pages.
Kim et al. "Robust Camera Lidar Sensor Fusion Via Deep Gated Information Fusion Network", 2018 IEEE Intelligent Vehicles Symposium (IV), 2018, pp. 1620-1625.
Afouras et al. "The Conversation: Deep Audio-Visual Speech Enhancement", IEEE transactions on pattern analysis and machine intelligence, Dated Jun. 19, 2018, 6 Pages.
Arevalo et al. "Gated Multimodal Units for Information Fusion", Workshop track—ICLR 2017, Dated Feb. 7, 2017, 17 Pages.
Biggio et al. "Evasion attacks against machine learning at test time", Joint European conference on machine learning and knowledge discovery in databases, pp. 387-402. Springer, 2013.
Chen et al. "Multi-View 3D Object Detection Network for Autonomous Driving", Proceedings of the IEEE Conference on Computer Vision and Pattern Recognition, Dated Jun. 22, 2017, 9 Pages.
Dalvi et al. "Adversarial Classification" Proceedings of the tenth ACM SIGKDD international conference on Knowledge discovery and data mining, 2004, 10 Pages.
Damen et al. "Scaling Egocentric Vision: The EPIC-KITCHENS Dataset", European Conference on Computer Vision (ECCV) 2018, 17 Pages.
Fernando et al. "Self-Supervised Video Representation Learning With Odd-One-Out Networks", Proceedings of the IEEE conference on computer vision and pattern recognition, Apr. 5, 2017, 10 Pages.
Geiger et al. "Are we ready for Autonomous Driving? The KITTI Vision Benchmark Suite", Conference on Computer Vision and Pattern Recognition (CVPR), 2012, 8 Pages.
Goodfellow et al. "Explaining and Harnessing Adversarial Examples", ICLR 2015 12 Pages.
Guo et al. "Deep Learning-Based Image Segmentation on Multimodal Medical Imaging" IEEE Transactions On Radiation and Plasma Medical Sciences, vol. 3, No. 2, Mar. 2019, pp. 162-169.
Hassan et al. "Learning Feature Fusion in Deep Learning-Based Object Detector", Hindawi Journal of Engineering vol. 2020, Article ID 7286187, 11 pages.
Huh et al. "Fighting Fake News: Image Splice Detection via Learned Self-Consistency", Proceedings of the European Conference on Computer Vision (ECCV) 2018, 17 Pages.
Kazakos et al. "EPIC-Fusion: Audio-Visual Temporal Binding for Egocentric Action Recognition", Aug. 22, 2019, 13 Pages.
Ku et al. "Joint 3D Proposal Generation and Object Detection from View Aggregation", 2018 IEEE/RSJ International Conference on Intelligent Robots and Systems (IROS), 8 Pages.
Kumar et al. "Gated Mechanism for Attention Based Multimodal Sentiment Analysis", ICASSP 2020-2020 IEEE International Conference on Acoustics, Speech and Signal Processing (ICASSP), 5 Pages.
Kurakin et al. "Adversarial Machine Learning At Scale", ICLR 2017, 17 Pages.
Madry et al. "Towards Deep Learning Models Resistant to Adversarial Attacks", arXiv preprint arXiv:1706.06083, Jun. 19, 2017, 28 Pages.
Mees et al. "Choosing Smartly: Adaptive Multimodal Fusion for Object Detection in Changing Environments", 2016 IEEE/RSJ International Conference on Intelligent Robots and Systems (IROS), 2016, pp. 151-156.
Miech et al. "Learnable pooling with Context Gating for video classification", arXiv preprint arXiv:1706.06905, Jun. 21, 2017, 8 Pages.
Qi et al. "Frustum PointNets for 3D Object Detection from RGB-D Data", Proceedings of the IEEE conference on computer vision and pattern recognition, Apr. 13, 2018, 15 Pages.
Raghunathan et al. "Certified Defenses Against Adversarial Examples", ICLR 2018, 15 Pages.
Redmon et al. "YOLO9000: Better, Faster, Stronger", arXiv:1612.08242v1, Dec. 25, 2016, 9 Pages.
Redmon et al. "YOLOv3: An Incremental Improvement", arXiv preprint arXiv:1804.02767, Apr. 8, 2018, 6 Pages.
Ren et al. "Generating Natural Language Adversarial Examples through Probability Weighted Word Saliency", Proceedings of the 57th Annual Meeting of the Association for Computational Linguistics, pp. 1085-1097 Florence, Italy, Jul. 28-Aug. 2, 2019.
Schroff et al. "FaceNet: A Unified Embedding for Face Recognition and Clustering", Proceedings of the IEEE conference on computer vision and pattern recognition, Jun. 17, 2015, 10 Pages.
Shafahi et al. "Adversarial Training for Free!", 33rd Conference on Neural Information Processing Systems (NeurIPS 2019), Vancouver, Canada, Nov. 20, 2019, 12 Pages.
Shazeer et al. "Outrageously Large Neural Networks: the Sparsely-Gated Mixture-Of-Experts Layer", ICLR 2017, 19 Pages.
Szegedy et al. "Intriguing properties of neural networks", arXiv preprint arXiv:1312.6199, Dec. 21, 2013, 9 Pages.
Valada et al. "AdapNet: Adaptive Semantic Segmentation in Adverse Environmental Conditions", Conference Paper May 2017, 9 Pages.
Wagner et al. "Multispectral Pedestrian Detection using Deep Fusion Convolutional Neural Networks", Proceedings of 24th European Symposium on Artificial Neural Networks, Computational Intelligence and Machine Learning (ESANN), Bruges, Belgium, Apr. 2016, 6 Pages.
Wang et al. "Pseudo-LiDAR from Visual Depth Estimation: Bridging the Gap in 3D Object Detection for Autonomous Driving", Proceedings of the IEEE Conference on Computer Vision and Pattern Recognition 2019, pp. 8445-8453.
Kolter et al. "Provable defenses against adversarial examples via the convex outer adversarial polytope", arXiv preprint arXiv:1711.00851, Nov. 2, 2017, 24 Pages.
Zadeh et al. "MOSI: Multimodal Corpus of Sentiment Intensity and Subjectivity Analysis in Online Opinion Videos", arXiv preprint arXiv:1606.06259, 2016, 10 Pages.
Zadeh et al. "Multimodal Language Analysis in the Wild: CMU-MOSEI Dataset and Interpretable Dynamic Fusion Graph", Proceedings of the 56th Annual Meeting of the Association for Computational Linguistics (Long Papers), pp. 2236-2246, Melbourne, Australia, Jul. 15-20, 2018.
Zadeh et al. "Memory Fusion Network for Multi-view Sequential Learning", arXiv preprint arXiv:1802.00927, Feb. 3, 2018, 9 Pages.
Xu et al. "Towards Feature Space Adversarial Attack", arXiv preprint arXiv:2004.12385, Dec. 16, 2020, 15 Pages.

* cited by examiner

DEFENDING MULTIMODAL FUSION MODELS AGAINST SINGLE-SOURCE ADVERSARIES

GOVERNMENT RIGHTS

At least one or more portions of this invention may have been made with government support under U.S. Government Contract No. 1190060-430433 awarded by Defense Advanced Research Projects Agency (DARPA). The U.S. Government may therefore have certain rights in this invention.

TECHNICAL FIELD

This disclosure relates generally to a robust multimodal machine learning system. More specifically, this application relates to improvements in robustness of the multimodal machine learning system via training and using an odd-one-out network with a robust fusion layer.

BACKGROUND

In the real world, information can be captured and expressed by different modalities. For example, a group of pixels in an image may be associated with tags and text explanations; sounds may be associated with vibrations due to speed, operating conditions, or environmental conditions; and ultrasound may be associated with distance, size, and density. Different modalities may be characterized by very different statistical properties. For instance, images are usually represented as pixel intensities or outputs of feature extractors, while sounds may be a time series, and ultrasound may produce a point cloud. Due to the distinct statistical properties of different information resources, it is very important to discover the relationship between different modalities. Multimodal learning is a good model to represent the joint representations of different modalities. The multimodal learning model is also capable to fill missing modality given the observed ones.

SUMMARY

A multimodal perception system includes a controller. The controller may be configured to, receive a first signal from a first sensor, a second signal from a second sensor, and a third signal from a third sensor, extract a first feature vector from the first signal, extract a second feature vector from the second signal, extract a third feature vector from the third signal, determine an odd-one-out vector from the first, second, and third feature vectors via an odd-one-out network of a machine learning network, based on inconsistent modality prediction, fuse the first, second, and third feature vectors and odd-one-out vector into a fused feature vector, and output the fused feature vector.

A multimodal perception method includes receiving a first signal from a first sensor, a second signal from a second sensor, and a third signal from a third sensor, extracting a first feature vectors from the first signal, a second feature vectors from the second signal, and a third feature vectors from the third signal, determining an odd-one-out vector from the first, second, and third feature vectors via an odd-one-out network of a machine learning network based on an inconsistent modality prediction, fusing the first, second, and third feature vectors and odd-one-out vector into a fused feature vector, and outputting the fused feature vector.

A multimodal perception system for an autonomous vehicle includes a first sensor that is one of a video, RADAR, LIDAR, or ultrasound sensor, and a controller. The controller may be configured to, receive a first signal from a first sensor, a second signal from a second sensor, and a third signal from a third sensor, extract a first feature vector from the first signal, extract a second feature vector from the second signal, extract a third feature vector from the third signal, determine an odd-one-out vector from the first, second, and third feature vectors via an odd-one-out network of a machine learning network, based on inconsistent modality prediction, fuse the first, second, and third feature vectors and odd-one-out vector into a fused feature vector, output the fused feature vector, and control the autonomous vehicle based on the fused feature vector.

DETAILED DESCRIPTION

Figure 1:
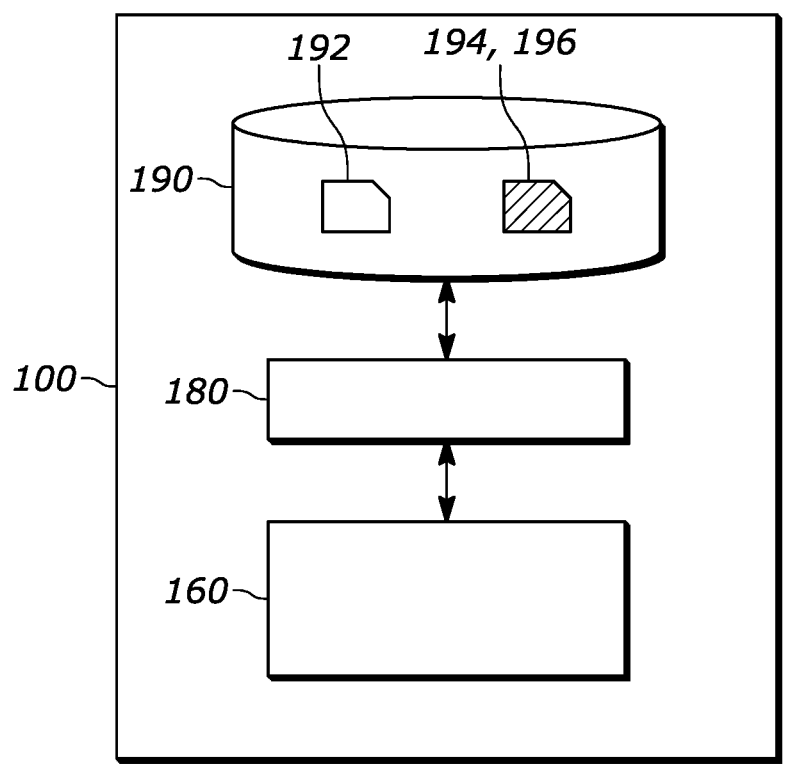
FIG. 1 is a block diagram of a system for training a neural network.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Beyond achieving high performance across many vision tasks, multimodal models are expected to be robust to single-source faults due to the availability of redundant information between modalities. This disclosure provides a solution to the robustness of multimodal neural networks against worst-case (i.e., adversarial) perturbations on a single modality. This disclosure will illustrate that standard multimodal fusion models are vulnerable to single-source adversaries, for example, an attack on any single modality can overcome the correct information from multiple unperturbed modalities and cause the model to fail. This unexpected vulnerability holds across diverse multimodal tasks and necessitates a solution. This disclosure presents an adversarially robust fusion strategy that trains the model to compare information coming from all the input sources, detect inconsistencies in the perturbed modality compared to the other modalities, and only allow information from the unperturbed modalities to pass through. This approach significantly improves on state-of-the-art methods in single-source robustness, achieving gains of 7.8-25.2% on action recognition, 19.7-48.2% on object detection, and 1.6-6.7% on sentiment analysis, without degrading performance on unperturbed (i.e., clean) data based on experimental results.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. In one embodiment, respective layers of the stack of layers being substituted may have mutually shared weights and may receive, as input, an output of a previous layer, or for a first layer of the stack of layers, an initial activation, and a part of the input of the stack of layers. The system may also include multiple layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyper parameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
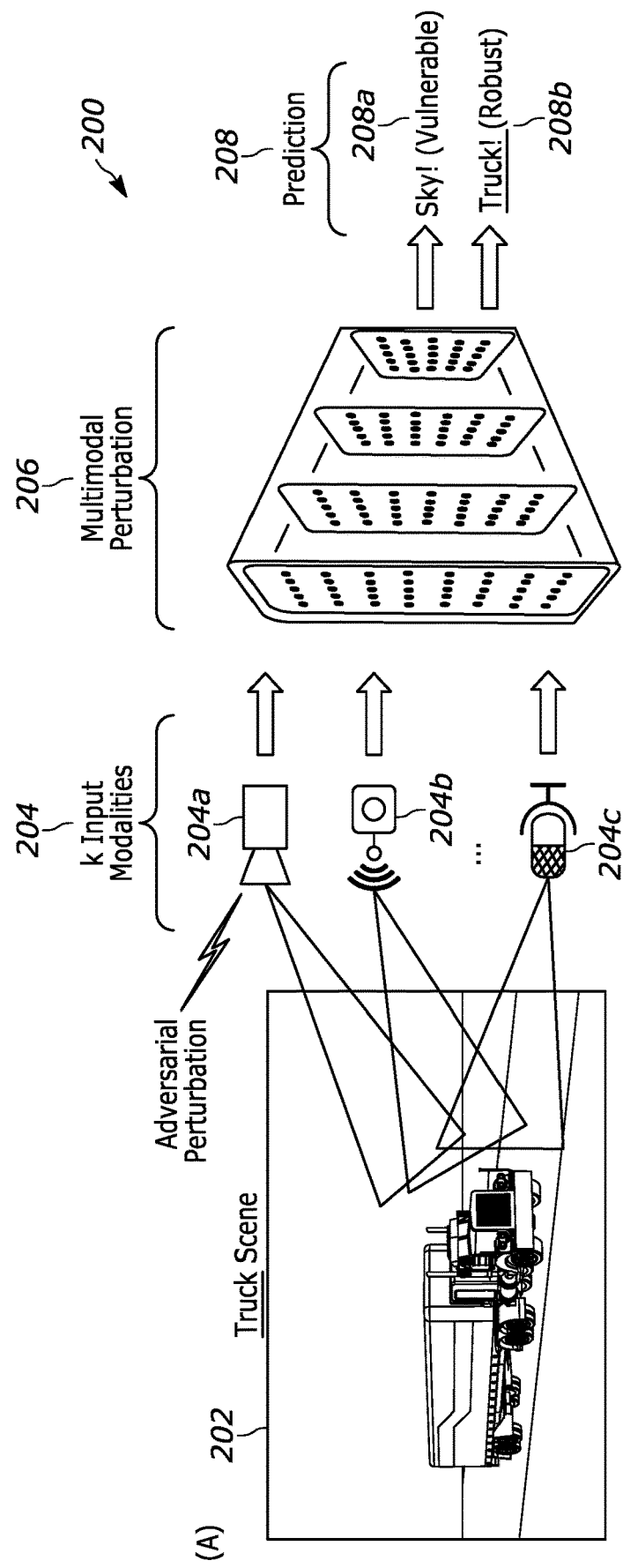
FIG. 2 is a graphical representations of an exemplary single source adversarial perturbation on a multimodal model with a vulnerable and robust output.

FIG. 2 is a graphical representations 200 of an exemplary single source adversarial perturbation on a multimodal model with a vulnerable and robust output. A scene 202 of a truck traveling down a road is analyzed by different modalities 204. In this example, the different modalities include a video camera 204a, a LIDAR sensor, 204b, and a microphone 204c, The data from the different modalities is processed by processor or controller in a multimodal model 206 and outputs a prediction of the scene 208 that can be used to control a system such as a robotic system, autonomous vehicle, industrial system, or other electrical/electromechanical system. If an adversarial perturbation occurs to one the modalities (e.g., the video camera 204a) the prediction 206 of the scene may be a venerable prediction 206a that is inaccurate. However, use of a robust multimodal model 206 may produce a robust prediction 206b of the truck even with the adversarial perturbation to the video camera 204a. This disclosure will present a system and method to produce a robust prediction in the event of an adversarial perturbation on a modalities and a system and method to train the robust multimodal model.

Figure 3:
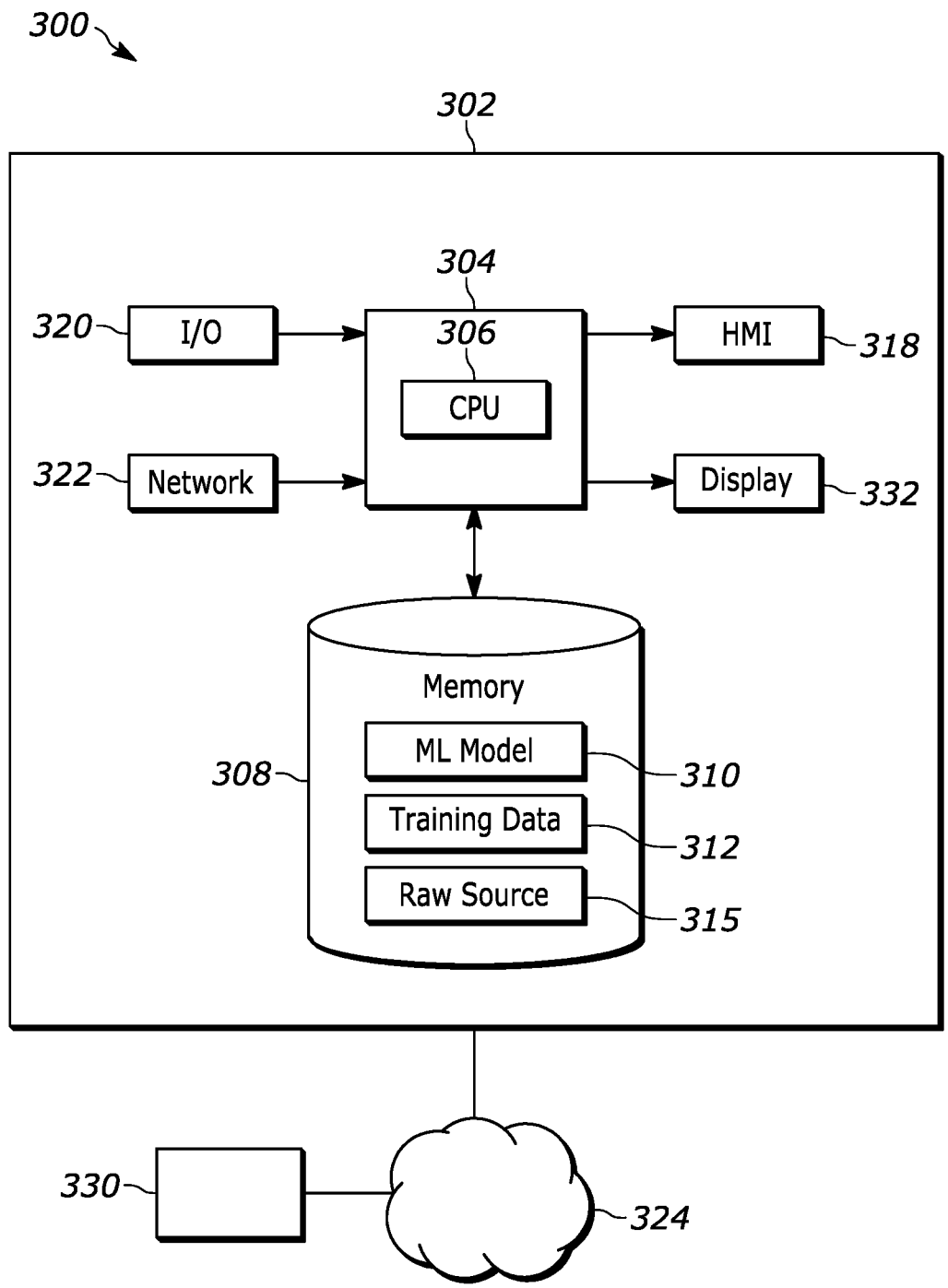
FIG. 3 is a block diagram of a data annotation system utilizing a machine learning model.

FIG. 3 depicts a data annotation system 300 to implement a system for annotating data. The data annotation system 300 may include at least one computing system 302. The computing system 302 may include at least one processor 304 that is operatively connected to a memory unit 308, The processor 304 may include one or more integrated circuits that implement the functionality of a central processing unit (CPU) 306. The CPU 306 may be a commercially available processing unit that implements an instruction stet such as one of the x86, ARM, Power, or MIPS instruction set families. During operation, the CPU 306 may execute stored program instructions that are retrieved from the memory unit 308. The stored program instructions may include software that controls operation of the CPU 306 to perform the operation described herein. In some examples, the processor 304 may be a system on a chip (SoC) that integrates functionality of the CPU 306, the memory unit 308, a network interface, and input/output interfaces into a single integrated device. The computing system 302 may implement an operating system for managing various aspects of the operation.

The memory unit 308 may include volatile memory and non-volatile memory for storing instructions and data. The non-volatile memory may include solid-state memories, such as NAND flash memory, magnetic and optical storage media, or any other suitable data storage device that retains data when the computing system 302 is deactivated or loses electrical power. The volatile memory may include static and dynamic random-access memory (RAM) that stores program instructions and data. For example, the memory unit 308 may store a machine-learning model 310 or algorithm, a training dataset 312 for the machine-learning model 310, raw source dataset 315. The model 310 may include an odd-one-out network as described in this disclosure and illustrated in FIG. 7. Also, the training dataset 312 may include features and the feature extractor as described in this disclosure and illustrated in FIGS. 4, 6, 7, and 8. And the raw source 315 may include data from multiple input modalities as described in this disclosure and illustrated in FIGS. 4, and 6.

The computing system 302 may include a network interface device 322 that is configured to provide communication with external systems and devices. For example, the network interface device 322 may include a wired and/or wireless Ethernet interface as defined by Institute of Electrical and Electronics Engineers (IEEE) 802.11 family of standards. The network interface device 322 may include a cellular communication interface for communicating with a cellular network (e.g., 3G, 4G, 5G). The network interface device 322 may be further configured to provide a communication interface to an external network 324 or cloud.

The external network 324 may be referred to as the world-wide web or the Internet. The external network 324 may establish a standard communication protocol between computing devices. The external network 324 may allow information and data to be easily exchanged between computing devices and networks. One or more servers 330 may be in communication with the external network 324.

The computing system 302 may include an input/output (I/O) interface 320 that may be configured to provide digital and/or analog inputs and outputs. The I/O interface 320 may include additional serial interfaces for communicating with external devices (e.g., Universal Serial Bus (USB) interface).

The computing system 302 may include a human-machine interface (HMI) device 318 that may include any device that enables the system 300 to receive control input. Examples of input devices may include human interface inputs such as keyboards, mice, touchscreens, voice input devices, and other similar devices. The computing system 302 may include a display device 332. The computing system 302 may include hardware and software for outputting graphics and text information to the display device 332. The display device 332 may include an electronic display screen, projector, printer or other suitable device for displaying information to a user or operator. The computing system 302 may be further configured to allow interaction with remote HMI and remote display devices via the network interface device 322.

The system 300 may be implemented using one or multiple computing systems. While the example depicts a single computing system 302 that implements all of the described features, it is intended that various features and functions may be separated and implemented by multiple computing units in communication with one another. The particular system architecture selected may depend on a variety of factors.

The system 300 may implement a machine-learning algorithm 310 that is configured to analyze the raw source dataset 315. The raw source dataset 315 may include raw or unprocessed sensor data that may be representative of an input dataset for a machine-learning system. The raw source dataset 315 may include video, video segments, images, text-based information, and raw or partially processed sensor data (e.g., radar map of objects). In some examples, the machine-learning algorithm 310 may be a neural network algorithm that is designed to perform a predetermined function. For example, the neural network algorithm may be configured in automotive applications to identify pedestrians in video images.

The computer system 300 may store a training dataset 312 for the machine-learning algorithm 310. The training dataset 312 may represent a set of previously constructed data for training the machine-learning algorithm 310. The training dataset 312 may be used by the machine-learning algorithm 310 to learn weighting factors associated with a neural network algorithm. The training dataset 312 may include a set of source data that has corresponding outcomes or results that the machine-learning algorithm 310 tries to duplicate via the learning process. In this example, the training dataset 312 may include source videos with and without pedestrians and corresponding presence and location information. The source videos may include various scenarios in which pedestrians are identified.

The machine-learning algorithm 310 may be operated in a learning mode using the training dataset 312 as input. The machine-learning algorithm 310 may be executed over a number of iterations using the data from the training dataset 312. With each iteration, the machine-learning algorithm 310 may update internal weighting factors based on the achieved results. For example, the machine-learning algorithm 310 can compare output results (e.g., annotations) with those included in the training dataset 312. Since the training dataset 312 includes the expected results, the machine-learning algorithm 310 can determine when performance is acceptable. After the machine-learning algorithm 310 achieves a predetermined performance level (e.g., 100% agreement with the outcomes associated with the training dataset 312), the machine-learning algorithm 310 may be executed using data that is not in the training dataset 312. The trained machine-learning algorithm 310 may be applied to new datasets to generate annotated data.

The machine-learning algorithm 310 may be configured to identify a particular feature in the raw source data 315. The raw source data 315 may include a plurality of instances or input dataset for which annotation results are desired. For example, the machine-learning algorithm 310 may be configured to identify the presence of a pedestrian in video images and annotate the occurrences. The machine-learning algorithm 310 may be programmed to process the raw source data 315 to identify the presence of the particular features. The machine-learning algorithm 310 may be configured to identify a feature in the raw source data 315 as a predetermined feature (e.g., pedestrian). The raw source data 315 may be derived from a variety of sources. For example, the raw source data 315 may be actual input data collected by a machine-learning system. The raw source data 315 may be machine generated for testing the system. As an example, the raw source data 315 may include raw video images from a camera.

In the example, the machine-learning algorithm 310 may process raw source data 315 and output an indication of a representation of an image. The output may also include augmented representation of the image. A machine-learning algorithm 310 may generate a confidence level or factor for each output generated. For example, a confidence value that exceeds a predetermined high-confidence threshold may indicate that the machine-learning algorithm 310 is confident that the identified feature corresponds to the particular feature. A confidence value that is less than a low-confidence threshold may indicate that the machine-learning algorithm 310 has some uncertainty that the particular feature is present.

Figure 4:
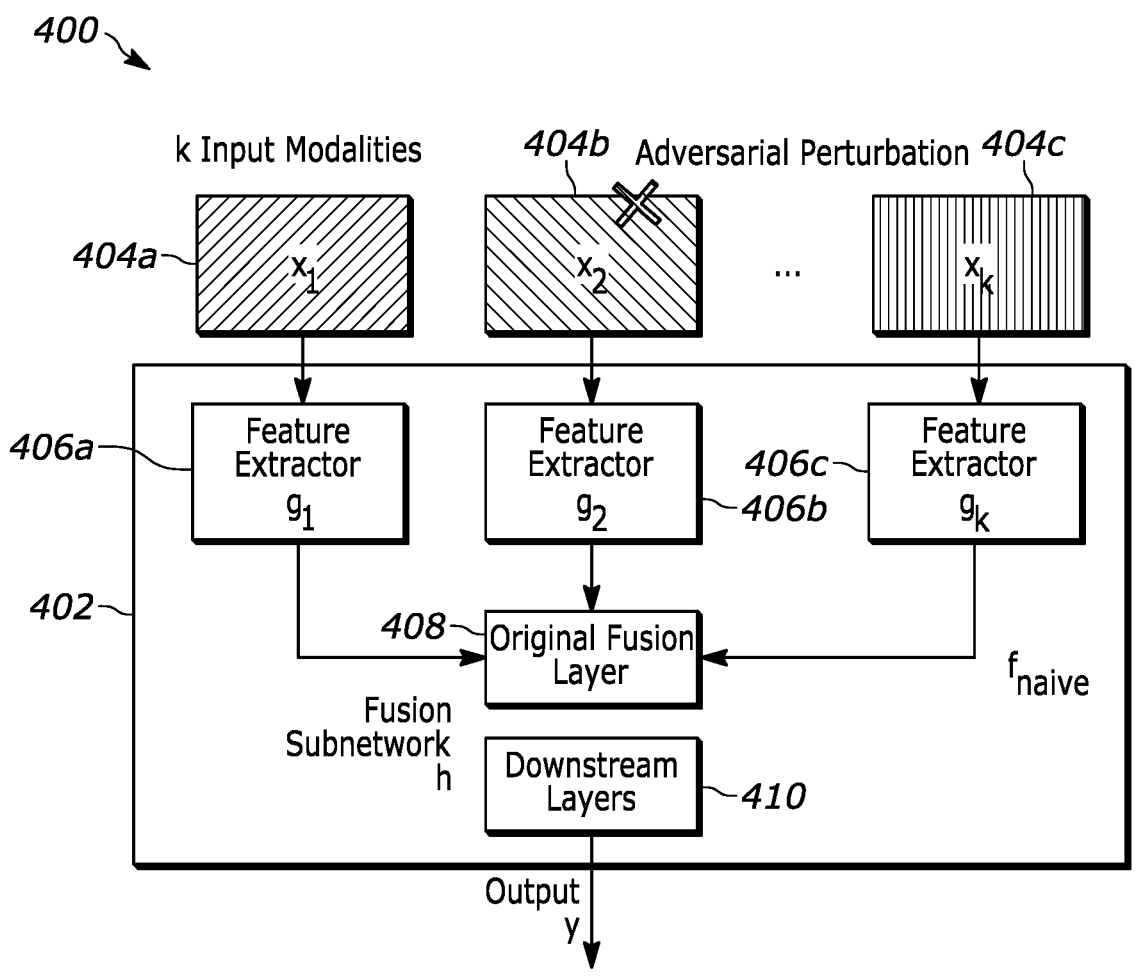
FIG. 4 is a graphical representation of a multimodal fusion network.

FIG. 4 is a graphical representation of a multimodal fusion system 400. The multimodal fusion network 402 receives input modalities 404a, 404b, 404c and extracts features 406a, 406b, 406c from each modality and fuses it in a fusion layer 408 and subsequent downstream layers 410 to produce an output. This multimodal fusion system 400 may be implemented on an electronic computing system. This system 400 may operate well under ideal conditions, however, if one of the modalities experiences an adversarial perturbation (e.g., input modality 404b) the system may provide an invalid output.

Figure 5:
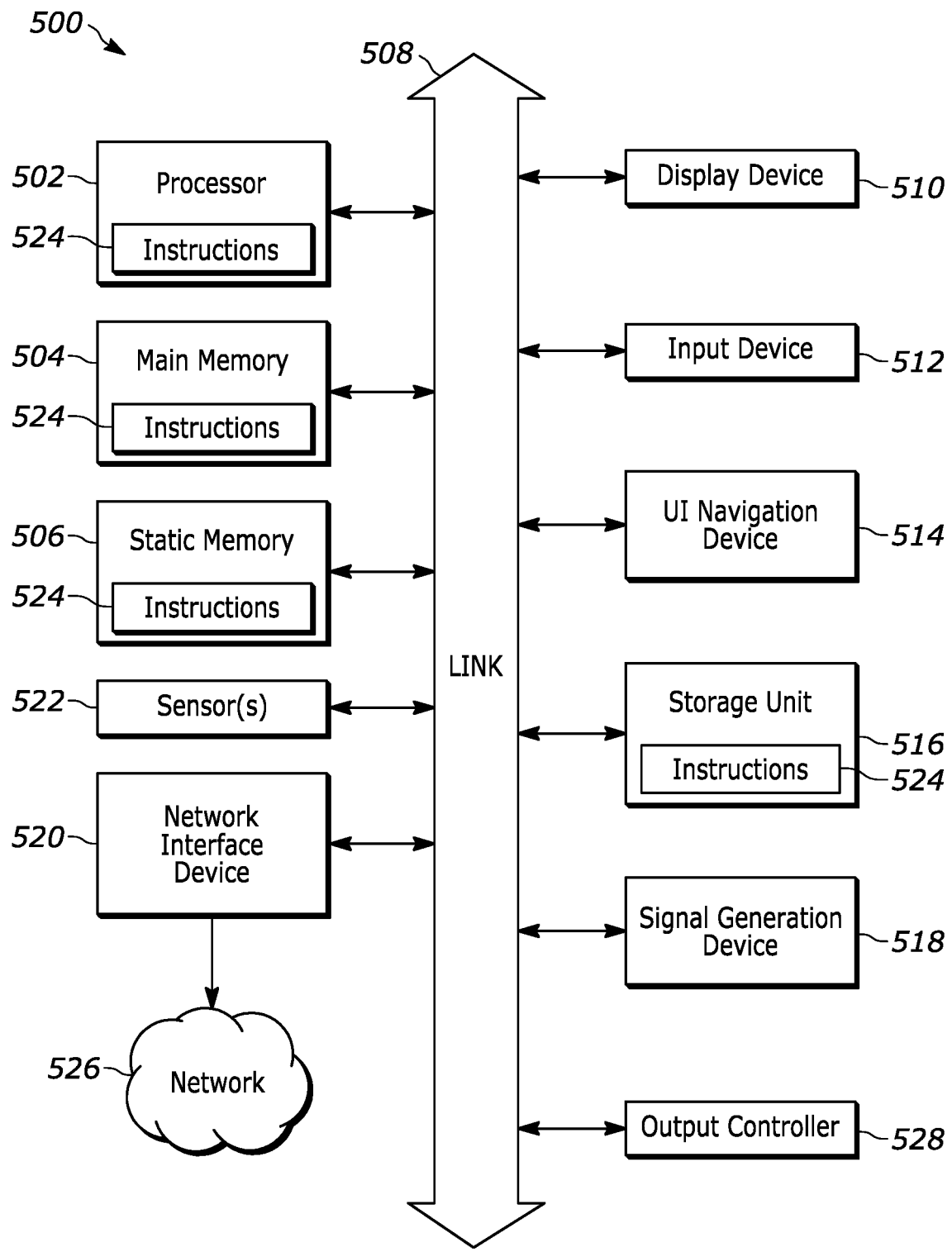
FIG. 5 is a block diagram of an electronic computing system.

Example Machine Architecture and Machine-Readable Medium. FIG. 5 is a block diagram of an electronic computing system suitable for implementing the systems or for executing the methods disclosed herein. The machine of FIG. 5 is shown as a standalone device, which is suitable for implementation of the concepts within this disclosure. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 5 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., controller, microcontroller, a central processing unit (CPU), a graphics processing unit (GPU), tensor processing unit (TPU), advanced processing unit (APU), or combinations thereof), one or more memories such as a main memory 504 a static memory 506, or other types of memory, which communicate with each other via link 508. Link 508 may be a bus or other type of connection channel. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless) to connect to and/or communicate over one or more networks 526.

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

Figure 6:
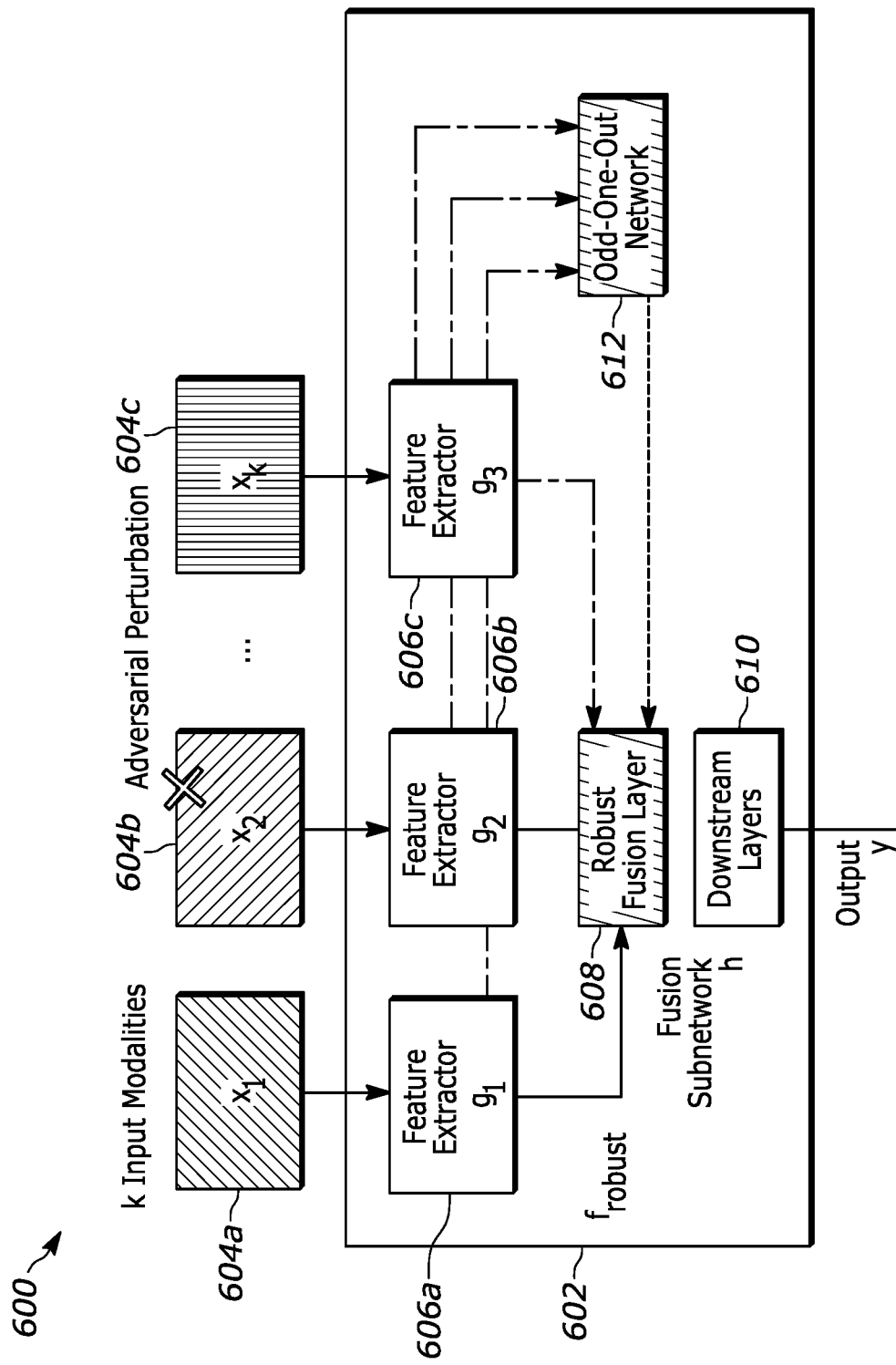
FIG. 6 is a graphical representation of a multimodal fusion network with an odd-one-out network.

FIG. 6 is a graphical representation of a multimodal fusion system with an odd-one-out network. The multimodal fusion network 602 receives input modalities 604a, 604b, 604c and extracts features 606a, 606b, 606c from each modality that are feature vectors. The output of the feature extractors 606 is fed into an odd-one-out network 612. The odd-one-out network 612 generates an "inconsistent"

modality prediction that is fed to a robust fusion layer 608 along with the output of the feature extractors 606. The robust fusion layer 608 outputs a fused feature vector that is subsequently fed to downstream layers 610 to produce an output. This multimodal fusion system 600 may be implemented on an electronic computing system.

Figure 7:
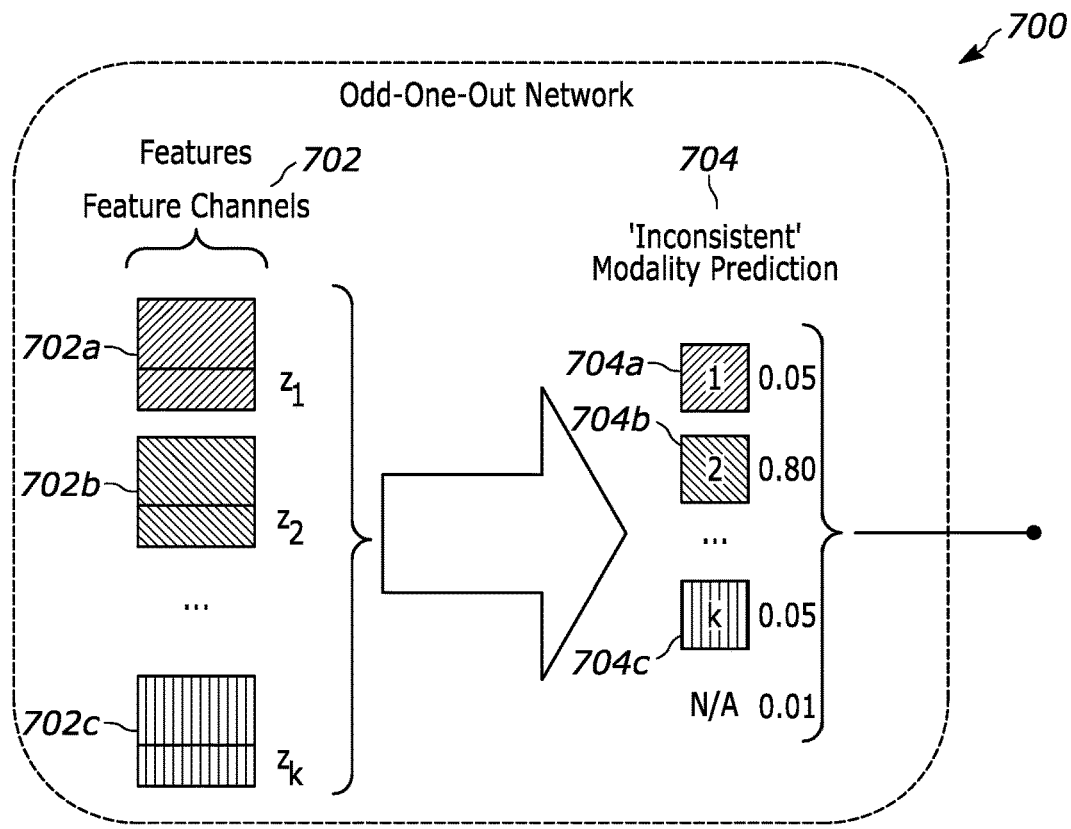
FIG. 7 is a graphical representation of an odd-one-out Network.

FIG. 7 is a graphical representation of an odd-one-out network 700 such as the odd-one-out network 612 from FIG. 6. The network 700 receives features 702 such as output from feature extractor 602*a*, 602*b*, and 602*c* and generates a modality prediction weights 704 such that for each feature channel is an associated modality prediction weight 704*a*, 704*b*, and 704*c*. These modality prediction weights 704*a*, 704*b*, and 704*c* produce an odd-one-out vector that is forwarded to the robust feature fusion layer.

Figure 8:
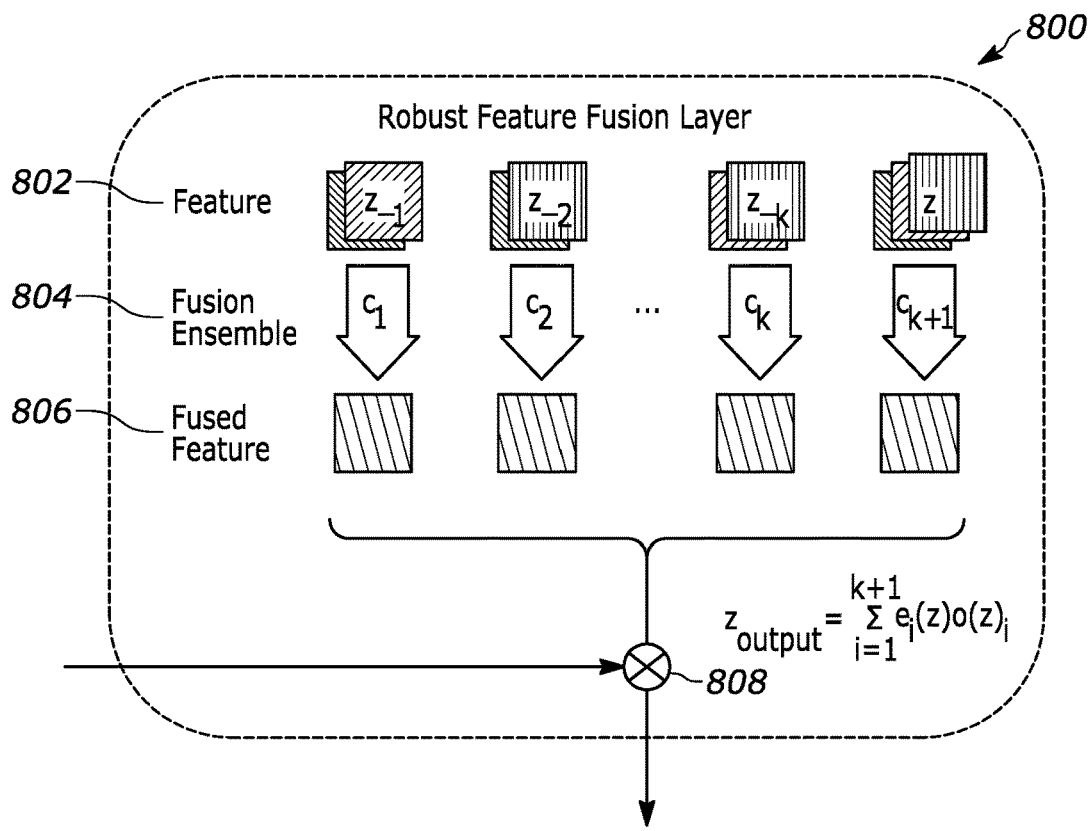
FIG. 8 is a graphical representation of a robust feature fusion layer with odd-one-out input.

FIG. 8 is a graphical representation of a robust feature fusion layer 800 with odd-one-out input. This fusion layer 800 receives features 802 from each modality and performs a fusion 804 on each modality to create fused features 806 for each modality. The fused features 806 are fused with the modality prediction 704 from FIG. 7 to create an output.

Consider the multimodal neural network, illustrated in FIG. 2 that fuses inputs from k different sources to identify objects for an autonomous driving system. If one of the modalities (e.g., Red Green Blue camera) receives a worst-case or adversarial perturbation, does the model fail to detect the truck in the scene? Alternatively, does the model make a robust prediction using the remaining k−1 unperturbed modalities (e.g., LIDAR, sensor, audio microphone, etc.)? This example illustrates the importance of single-source adversarial robustness for avoiding catastrophic failures in real-world multimodal systems. In a realistic setting, any single modality may be affected by a worst-case perturbation, whereas multiple modalities usually do not fail simultaneously particularly if the physical sensors are not coupled.

In the field of adversarial robustness, most studies have focused on the unimodal setting rather than the multimodal setting. An effective strategy for defending unimodal models against adversaries is adversarial training (i.e., end-to-end training of the model on adversarial examples). In principle, adversarial training could be extended to multimodal models as well, but it has several downsides: (1) it is resource-intensive and may not scale well to large, multi modal models that contain many more parameters than their unimodal counterparts; (2) it significantly degrades performance on clean data. For these reasons, end-to-end adversarial training may not be practical for multimodal systems used in real-world tasks.

This disclosure presents multimodal robustness against single source adversaries on diverse benchmark tasks with three modalities (k=3): action recognition on EPIC-Kitchens, object detection on KITTI, and sentiment analysis on CMU-MOSI. Although this disclosure uses three modalities as an example, this disclosure is not limited to 3 modalities, but can be extended to more than 3. This disclosure will illustrate that standard multimodal fusion practices are vulnerable to single-source adversarial perturbations. Even when there are multiple unperturbed modalities that could yield a correct prediction, the use of a naive ensembling of features from a perturbed modality with features from clean modalities may not automatically yield robust prediction. As shown in FIG. 4, a worst-case input at any single modality of a multi modal model can outweigh the other modalities and cause the model to fail. In fact, contrary to expectations, in some instances a multimodal model (k=3) under a single-source perturbation did not outperform a unimodal model (k=1) under the same attack.

This disclosure presents an adversarially robust fusion strategy that can be applied to mid- to late-fusion models to defend against this vulnerability without degrading clean performance. Based on a hypothesis that a multimodal model can be trained to detect correspondence (or lack thereof) between features from different modalities and use this information to perform a robust feature fusion that defends against the perturbed modality. This approach extends existing work on adaptive gating strategies with a robust fusion training procedure based on odd-one-out learning to improve single-source adversarial robustness without degrading clean performance. Through extensive experiments, this approach has been effective even against adaptive, white-box attacks with access to the robust fusion strategy. An exemplary embodiment of this system significantly outperformed state-of-the-art methods in single-source robustness. Results of testing this exemplary system and method achieved gains of 7.8-25.2% on action recognition on EPICKitchens, 19.7-48.2% on 2D object detection on KITTI, and 1.6-6.7% sentiment analysis on CMU-MOSI.

Generally, multimodal models are not inherently robust to single-source adversaries, but this disclosure illustrates how to improve the robustness of multimodal models without the downsides associated with end-to-end adversarial training in unimodal models. The combination of robust fusion architectures with robust fusion training may be a practical strategy for defending real-world systems against adversarial attacks and establishes a promising direction for future research.

Adversarial Robustness. Vision systems based on deep learning models are susceptible to adversarial attacks—additive, worst-case, and imperceptible perturbations on the inputs that cause erroneous predictions. A large number of defense methods against adversarial attacks have been proposed, with the two most effective defenses being end-to-end adversarial training, which synthesizes adversarial examples and includes them in training data, and provably robust training, which provides theoretical bounds on the performance. However, these methods have focused on the unimodal setting, in which the input is a single image. In contrast to those works, consider single-source adversarial perturbations in the multimodal setting and leverage consistent information between modalities to improve the robustness of the model's fusion step. This training procedure is related to adversarial training in the sense that it also use perturbed inputs, but instead of end-to-end training of model parameters, the focus is on designing and training the feature fusion in a robust manner. This strategy brings benefits from adversarial training, while retaining performance on clean data and significantly reducing the number of parameters that need to be trained on perturbed data.

Multimodal Fusion Models. Multimodal neural networks have good performance across a variety of vision tasks, such as scene understanding, object detection, sentiment analysis, speech recognition, and medical imaging. In terms of fusion methods, gating networks weigh sources adaptively depending on the inputs. These fusion methods leverage multiple modalities to improve clean performance on the task, but do not evaluate or extend these approaches to improve single-source robustness, which is one of the focuses of this disclosure.

Single Source Robustness. Several recent works provide important insights into the effects of single-source corruptions such as occlusions, dropout, and Gaussian noise on object detection systems with two modalities (k=2). In contrast to this, this disclosure considers single source adversarial perturbations, which explore worst-case failures of multimodal systems due to one perturbed modality. This disclosure considers other tasks in addition to object detection and evaluate models with three modalities (k=3), in which there are more clean sources than perturbed sources. In terms of defense strategies, robust multimodal fusion methods based on end-to-end robust training and adaptive gating fusion layers improve single-source robustness to corruptions. This disclosure extends this by developing a robust fusion strategy that leverages correspondence between unperturbed modalities to defend against the perturbed modality, and is effective against more challenging adversarial perturbations.

Single Source Adversarial Perturbations.

Let f:x 7→y denote a multimodal model with k input modalities (i.e., $x=[x_1, \ldots, x_k]$). Consider the extent to which the performance of f is degraded by worst-case perturbations on any single modality $i \in [k]$ (where $[k]=\{1, \ldots, k\}$) while the other k−1 modalities remain unperturbed. To this end, define a single-source adversarial perturbation against f on modality i as equation 1, $$\delta^{(i)}(x, y; f) := \arg \max_{\|\delta\|_p \le \epsilon} \mathcal{L}(f(x_i + \delta, x_{-i}), y) \tag{1}$$

In which $\mathcal{L}$ is the loss function and $\epsilon > 0$ defines the allowable range of the perturbation $\delta^{(i)}$. Assume that the multimodal inputs x and outputs y are sampled from a distribution D, then the single-source adversarial pedbrmance of f with respect to modality $i \in [k]$ is given by, $$\mathbb{E}_{(x,y)\sim \mathcal{D}} \max_{\|\delta\|_p \le \epsilon} [\mathcal{L}(f(x_i + \delta, x_{-i}), y)]. \tag{2}$$

The difference between the performance of f on unperturbed data, i.e., $\mathbb{E}_{(x,y)\sim \mathcal{D}} [\mathcal{L}(f(x_i + \delta, x_{-i}), y)]$, and its single-source adversarial performance specified in Equation (2) indicates, on average, the sensitivity of f to its worst-case inputs on modality i. Ideally, a multimodal model that has access to multiple input modalities with redundant information should not be sensitive to perturbations on a single input; it should be able to make a correct prediction by leveraging the remaining k−1 unperturbed modalities. However, it can be shown that across diverse multimodal benchmark tasks, standard multimodal fusion models are surprisingly vulnerable to these perturbations, even though the clean modalities outnumber the perturbed modality. The experiments and results are provided in later sections of this disclosure, but this vulnerability necessitates a solution.

Adversarially Robust Fusion Strategy.

Let $f_{naive}$ be a standard multimodal neural network, pre-trained to achieve acceptable performance on unperturbed data, i.e., it minimizes $\mathbb{E}_{(x,y)\sim \mathcal{D}} [\mathcal{L}(f_{naive}(x), y)]$. The robust fusion strategy disclosed herein aims to improve the single-source robustness of $f_{naive}$ by leveraging the correspondence between the unperturbed modalities to detect and defend against the perturbed modality. Assume that $f_{naive}$ has a mid- to late-fusion architecture, consisting of the composition of modality-specific feature extractors $g_1, \ldots, g_k$ applied to their respective modalities and a fusion subnetwork h:

$$f_{naive}(x) := h(g_1(x_1), g_2(x_2), \ldots, g_k(x_k)) \tag{3}$$

To make $f_{naive}$ robust, we equip it with an auxiliary odd-one-out network and a robust feature fusion layer in place of the default feature fusion operation, as shown in FIG. 2(a). Then perform robust training based on odd-one-out learning and adversarial training that focuses on these new modules. The odd-one-out network o is trained to detect the inconsistent or perturbed modality when presented with feature representations of different modalities (e.g., Odd-One-Out Learning). The robust feature fusion layer ensembles different multimodal fusion operations using the output of the odd-one-out network, ensuring that only the modalities that are consistent with each other are passed to the downstream layers (e.g., Robust Feature Fusion Layer). Denote the fusion subnetwork h equipped with the robust feature fusion layer as h̃h˜, and denote the full, augmented multimodal model as $f_{robust}$, as expressed by equation 4, $$f_{robust}(x) := \tilde{h}(g_1(x_1), g_2(x_2), \ldots, g_k(x_k); o(\{g_i(x_i)\}_{i \in [k]})), \tag{4}$$

Finally, jointly train the odd-one-out network o and the fusion subnetwork h˜, while keeping the weights and architectures of the feature extractors $g_1, \ldots, g_k$ fixed from $f_{naive}$ (e.g., Robust Training Procedure).

Odd-One-Out Learning.

Odd-one-out learning is a self-supervised task that aims to identify the inconsistent element from a set of otherwise consistent elements (e.g., FIG. 7). To leverage the shared information between modalities, augment the multimodal model with an odd-one-out network. Given the set of features $z=[z_1, \ldots, z_k]$ extracted from the k-modality input, the odd-one-out network predicts whether the multimodal features are consistent with each other (i.e., the inputs are all clean), or whether one modality is inconsistent with the others (i.e., some input has been perturbed). To perform this task, the odd-one-out network must compare the features from different modalities, recognize the shared information between them, and detect any modality that is not consistent with the others. For convenience, take the features to be the final outputs of the feature extractor networks $g_1, \ldots, g_k$ applied to their respective modalities. In principle, though, these features could also come from any of the intermediate layers of the feature extractors.

Concretely, the odd-one-out network is a neural network o that maps the features z to a vector of size k+1, as shown in FIG. 7. The i-th entry of this vector indicates the probability that modality i has been perturbed, i.e., $z_i$ is inconsistent with the other features, The k+1-th entry of the vector indicates the probability that none of the modalities are perturbed. The odd-one-out network o is trained to perform odd-one-out prediction by minimizing the following cross-entropy loss:

$$-\mathbb{E}_{\substack{(x,y)\sim \mathcal{D} \\ z_i = g_i(x_i)}} \left[ \log o(z)_{k+1} + \sum_{i=1}^{k} \log o(z_i^*, z_{-i})_i \right], \tag{5}$$

In which $z^*_i = g_i(x^*_i)$ is the feature extracted from perturbed input$^{x*_i}$ that was generated during training.

Robust Feature Fusion Layer.

To integrate the output of the odd-one-out network o into the multimodal model, consider a feature fusion layer inspired by the mixture-of-experts layer (e.g., FIG. 8). This layer consists of an ensemble of k+1 feature fusion operations $e_1, \ldots, e_{k+1}$, each of which is specialized to exclude one modality, as illustrated in FIG. 8. Formally, each fusion operation takes the multimodal features z as input and performs a fusion of a subset of the features as follows:

$$e_i(z) = NN(\oplus z_{-i}) \forall_i \in [k], e_{k+1}(z) = NN(\oplus z), \tag{6}$$

in which ⊕ denotes the concatenation operation and NN stands for a shallow neural network. By definition, $e_i$ is responsible for performing a fusion of features from all the modalities except for i, and only $e_{k+1}$ fuses features from all the modalities.

| | Algorithm 1 Robust training |
|---|---|
| 1 | Procedure GRADIENTUPDATE |
| 2 | $\ell_{odd} \leftarrow 0$ |
| 3 | $\ell_{task} \leftarrow 0$ |
| 4 | Sample $x = [x_1, ..., x_k]$, y from D |
| 5 | $z = [z_1, ..., z_k] \leftarrow [g_1(x_1), ..., g_k(x_k)]$ |
| 6 | $\ell_{odd} \leftarrow \ell_{odd} - \log o(z)_{k+1}$ |
| 7 | $\ell_{task} \leftarrow \ell_{task} + L(h(z, o(z)), y)$ |
| 8 | for $i \in [k]$ do |
| 9 | $\delta^{(i)} \leftarrow \delta^{(i)}(x,y;f_{robust})$ |
| 10 | $z_i^* \leftarrow g_i(x_i + \delta^{(i)})$ |
| 11 | $\ell_{odd} \leftarrow \ell_{odd} - \log o(z_i^*, z_{-i})_{k+1}$ |
| 12 | $\ell_{task} \leftarrow \ell_{task} + L(h(z_i^*, z_{-i}, o(z_i^*, z_{-i})), y)$ |
| 13 | $\ell_{odd} \leftarrow + \ell_{task}$ |
| 14 | Update o, h based on $\nabla \ell$ |

If feature $z_i$ is not consistent with features from the other k−1 modalities because it results from a perturbed input, then $e_i$ receives more weight than the other fusion operations based on the output of the odd-one-out network:

$$z_{output} = \Sigma_{i=1}^{k+1} e_i(z) o(z)_i. \quad (7)$$

Then form a robust fusion subnetwork h~ by equipping the fusion subnetwork h with this robust feature fusion layer. Then h~ and to are trained to optimize clean performance, as expressed by equation 8, $$\mathbb{E}_{(x,y)\sim\mathcal{D}\atop z_i=g_i(x_i)} \left[ \mathcal{L}(\tilde{h}(z; o(z)), y) \right] \quad (8)$$

as well as the single-source robust performance, as expressed by equation 9

$$\mathbb{E}_{(x,y)\sim\mathcal{D}\atop z_i=g_i(x_i)} \left[ \mathcal{L}(\tilde{h}(z_i^*, z_{-i}; o(z_i^*, z_{-i})), y) \right] \quad (9)$$

with respect to each modality, where $z^*_i = g_i(x^*_i)$ is the feature extracted from perturbed input $x^*_i$ that was generated during training. Note that one of the arguments into the fusion network h~ is now the output of o.

Spatiotemporal Dimensions. The formulations assume that $z_1, \ldots, z_k$ are one-dimensional feature representations, in which case the odd-one-out network o and fusion operations $e_1, \ldots, e_{k+1}$ can be implemented as shallow fully connected networks (e.g., two fully-connected layers). In many multimodal models, the features also have spatiotemporal dimensions that are aligned between different modalities, i.e., $z_i \in \mathbb{R}^{c_i \times N_1 \times \cdots \times N_d}$, in which $c_i$ is the number of feature channels and $N_1 \times \ldots \times N_d$ are the shared spatiotemporal dimensions (e.g., audio and visual features extracted from a video are aligned along the temporal axis, features extracted from different visual modalities are aligned along the spatial axes). In those cases, our odd-one-out network and fusion operations are more efficiently implemented as convolutional neural networks with $1 \times \ldots \times 1$ filters. This enables the computation of the losses in Equations (5) and (7) in parallel over the spatiotemporal dimensions.

Robust Training Procedure

The multimodal model $f_{robust}$, which is equipped with an odd-one-out network o and fusion subnetwork h~, contains a mechanism to compare information coming from all the input sources, detect that the perturbed modality is inconsistent with the other unperturbed modalities, and only allow information from the unperturbed modalities to pass through. During training, generate perturbed inputs $x^*_i$ fusing the single-source adversarial perturbations from Equation 1, i.e., let $$x^*_i = x_i + \delta^{(i)}(x, y, f_{robust}) \quad (10)$$

Note that this adversarial perturbation is generated against $f_{robust}$. In other words, this approach performs adversarial training of the fusion network and also leverages the adversarial examples to provide self-supervised labels for odd-one-out learning. Optimize the parameters of the odd-one-out network o and the fusion subnetwork h~ with respect to the losses in Equations (5), (8), and (9), as shown in Algorithm 1. It was noticed that it was not necessary to retrain the feature extractors $g_1, \ldots, g_k$, which are already pretrained on clean data.

Figure 9:
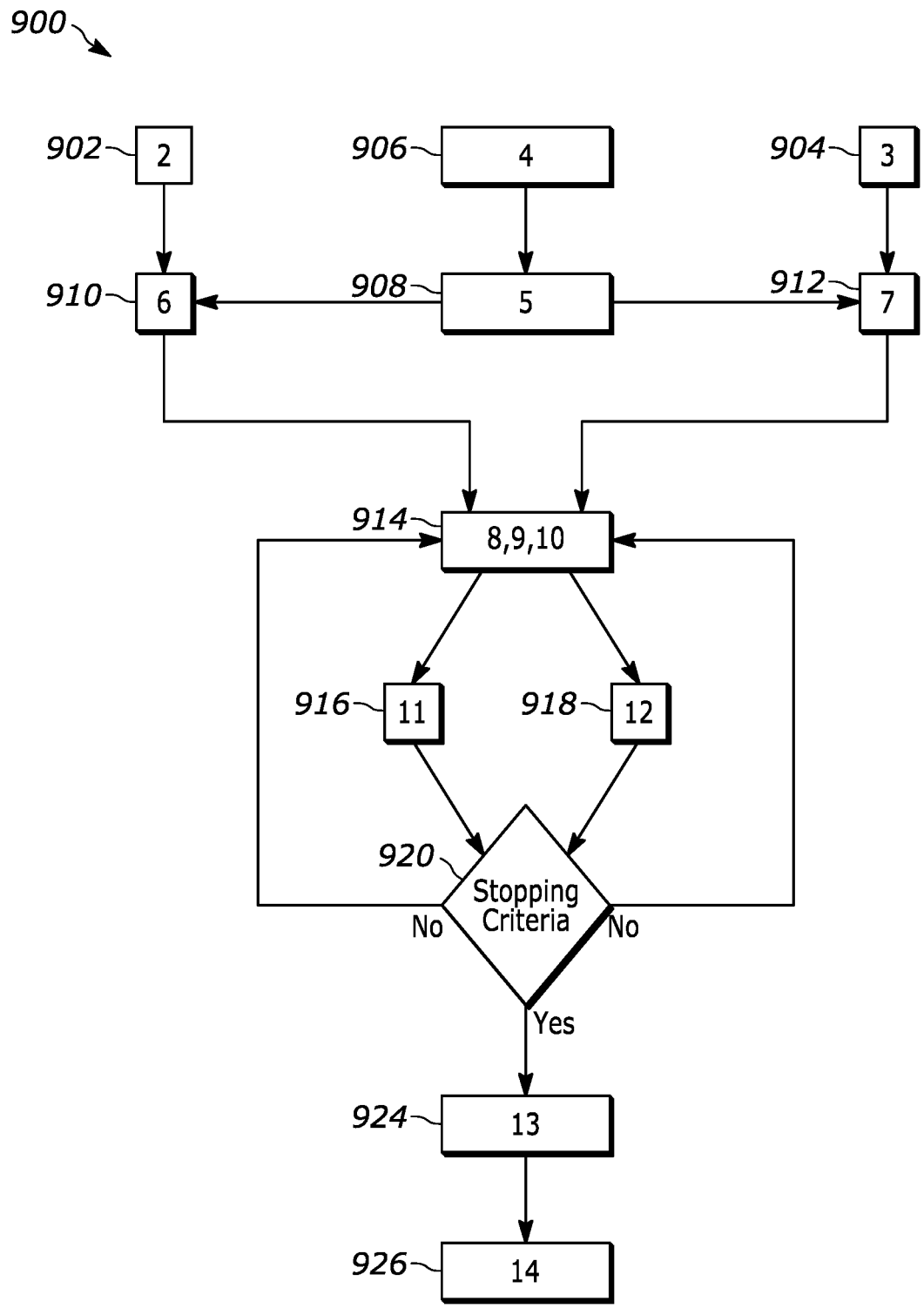
FIG. 9 is a flow diagram of a robust training strategy for feature fusion and odd-one-out networks.

FIG. 9 is a flow diagram of a robust training strategy 900 for feature fusion and odd-one-out networks. This flow diagram corresponds to Algorithm 1 above. In step 902, a controller initializes odd-one-out losses as shown in line 2 of Algorithm 1, in step 904 the controller initializes task losses as shown in line 3 of Algorithm 1. In step 906 the controller receives samples from a training dataset as shown in line 4 of Algorithm 1 and proceeds to step 908 where the controller processes the samples using function g as shown in line 5 of Algorithm 1. In step 910 the controller updates odd-one-out losses with samples with no perturbation as shown in line 6 of Algorithm 1, In step 912 the controller updates task losses with samples with no perturbation as shown in line 7 of Algorithm 1, In step 914 the controller generates a perturbation, for each modality, In step 916 the controller updates odd-one-out losses with samples with an adversarial perturbation as shown in line 11 of Algorithm 1. In step 918 the controller updates task losses with samples with an adversarial perturbation as shown in line 12 of Algorithm 1. In step 920 the controller, in response to the stopping criteria not being met, branches back to step 914 to provide an iteration for another perturbations. And, in response to the stopping criteria being met, the controller will branch to step 924. In step 924, the controller will calculate the total losses including odd-one-out losses and task losses as shown in line 13 of Algorithm 1. In step 926, the controller will update the fusion function and odd-one-out networks as shown in line 14 of Algorithm 1. The stopping criteria in step 920 may include a predetermined number of iterations, a predetermined run time, a convergence to a threshold, or a combination thereof.

Exemplary Experimental Data.

An exemplary evaluation of the single-source adversarial robustness of multimodal models was performed on three benchmark tasks: action recognition on EPIC-Kitchens, 2D object detection on KITTI, and sentiment analysis on MOSI. The benchmarks that were considered involved three input modalities and span a larger variety of tasks and data sources, ensuring generality of the conclusions drawn. A summary can be found in Table 1.

TABLE 1

A summary table of experimental setups.

| Dataset | Tasks | Input Modalities | Model | Adversarial Perturbation | Evaluation Metrics |
|---|---|---|---|---|---|
| EPIC-Kitchens | Action recognition | Visual frames; Motion frames (flow); Audio (spectrogram) | Feature extractors: 8Ninception (all); Fusion: feed-forward network + temporal pooling; Odd-one-out network: feed-forward network | PGD (10-step): e = 8/256 (vision) e = 8/256 (motion) e = 0.8 (audio) | Top-1, top-5 accuracy: Verbs, nouns, actions |
| KITTI | 2D object detection | Visual frame; Depth map (Velodyne); Depth map (stereo image) | Feature extractors: Darknet19 (all); Fusion: 1 × 1 conv layer + YOLO; Odd-one-out network: 1 × 1 conv net; | PGD (10-step): e = 16/256 (w) | Average precision: Cars (>0.7 IoU), Pedestrians (>0.5 oU), Cyclists (>0.5 IoU) |
| MOSI | Sentiment analysis | Visual frame, Audio (mel ceptron); Text | Feature extractors: FaceNet + LSTM (vision), MFCC + LSTM (audio), transformer [ ] (text); Fusion: feed-forward network Odd-one-out network: feed-forward network | PGD (10-step): = 8/256 (vision) < = 0.8 (audio) word replacement, 1-word per sentence (text) | Binary accuracy 7-class accuracy |

Exemplary Multimodal Benchmark Tasks.

Figure 10:
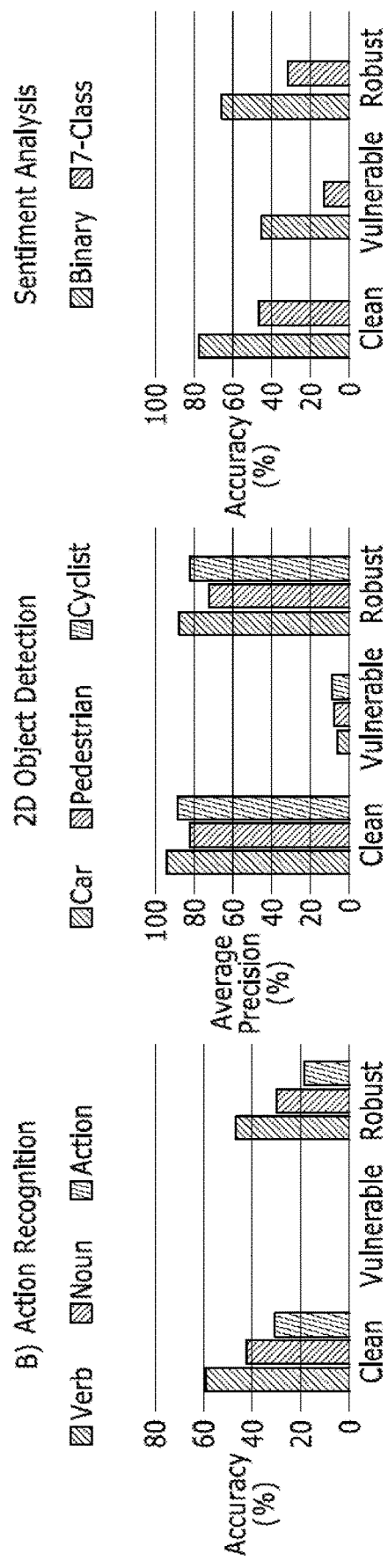
FIG. 10A is a graphical representation of exemplary action recognition results.
FIG. 10B is a graphical representation of exemplary 2 dimensional object detection results.
FIG. 10C is a graphical representation of exemplary sentiment analysis results.

Exemplary Action recognition on EPIC-Kitchens. EPIC-Kitchens is a large egocentric video dataset consisting of 39,596 video clips. The objective is to predict the action taking place in the video, which is composed of one verb and one noun out of 126 and 331 classes respectively. Three modalities are available from the original dataset: visual information (RGB frames), motion information (optical flow), and audio information. FIG. 10A is a graphical representation of exemplary action recognition results.

Exemplary Object Detection on KITTI. KITTI is an autonomous driving dataset that contains stereo camera and LIDAR information for 2D object detection, where the objective is to draw bounding boxes around objects of interest from predefined classes, i.e., car, pedestrian, cyclist, etc. Existing works use different combinations and processed versions of the available data modalities for object detection. For the proposed benchmark, consider the following three modalities: (1) RGB frames, which are used by the majority of detection methods, (2) LIDAR points projected to a sparse depth map and (3) a depth map estimated from the stereo views. FIG. 10B is a graphical representation of exemplary 2 dimensional object detection results.

Exemplary Sentiment Analysis on CMU-MOSI. Multimodal Opinion-level Sentiment Intensity Corpus (CMU-MOSI) is a multi modal dataset for sentiment analysis consisting of 93 video clips of movie reviews, each of which are divided into an average of 23.2 segments. Each segment is labeled with a continuous sentiment intensity between [−3,3]. The objective is to predict the sentiment on a binary scale (i.e., negative v. positive) or 7-class scale (i.e., rounding to the nearest integer). MOSI contains three modalities: text, video and audio. FIG. 10C is a graphical representation of exemplary sentiment analysis results.

Exemplary Implementation Details.

Exemplary Model Architecture and Training. For each task, it was considered mid- to late-multimodal models that use the architectures summarized in column 4 of Table 1. A first train baseline multimodal models for each task on clean data was performed to obtain $f_{naive}$. Then augment these models with the odd-one-out network and robust feature fusion layer as per the adversarially robust fusion strategy to obtain $f_{robust}$, and perform robust training according to Algorithm 1.

Exemplary Adversarial Attacks. The adversarial perturbations for each task are summarized in column 5 of Table 1. Attack individual modalities using projected gradient descent (PGD), except text, for which the use of word replacement was used. Note that these perturbations are white-box adaptive attack, i.e., attacks are generated with full knowledge of $f_{robust}$. Other types of attacks, such as transfer attacks, targeted attacks, and feature-level attacks were also performed.

Exemplary Evaluation Metric. The metrics used for each task are summarized in column 6 of Table 1. For the action recognition, consider classification accuracy of verbs, nouns, and actions. For object detection, consider the average precision of car, pedestrian, and cyclist detection at intersection-over-union (IoU) thresholds shown in the table, and at three difficulty levels following the KITTI evaluation server. For sentiment analysis, consider binary and 7-class prediction accuracy. For each metric, consider clean performance as well as performance under single-source attacks.

TABLE 2

Top-1 classification accuracy results on EPIC-Kitchens dataset under clean data and single-source adversarial perturbations on each modality.

| Fusion | Clean | | | Visual Perturbation | | | Motion Perturbation | | | Audio Perturbation | | |
|---|---|---|---|---|---|---|---|---|---|---|---|---|
| | Verb | Noun | Action | Verb | Noun | Action | Verb | Noun | Action | Verb | Noun | Action |
| Oracle (Upper Bound) | — | — | — | 55.8 | 31.4 | 21.9 | 50.0 | 37.2 | 23.8 | 53.9 | 39.2 | 25.6 |
| Concat Fusion | 59.0 | 42.1 | 30.2 | 0.1 | 0.0 | 0.0 | 0.2 | 0.0 | 0.0 | 0.1 | 0.0 | 0.0 |
| Mean Fusion | 56.8 | 40.4 | 27.6 | 0.3 | 0.8 | 0.0 | 0.3 | 0.3 | 0.0 | 0.4 | 0.3 | 0.0 |
| LEL + Robust | 61.2 | 43.1 | 30.5 | 22.3 | 11.6 | 6.6 | 25.4 | 24.6 | 12.0 | 20.4 | 17.7 | 8.0 |
| Gating +Robust | 60.9 | 43.0 | 30.6 | 26.0 | 10.9 | 6.2 | 35.9 | 26.9 | 14.3 | 21.3 | 16.2 | 7.0 |
| Ours | 61.5 | 42.5 | 31.4 | 48.0 | 24.2 | 16.8 | 48.5 | 35.6 | 22.1 | 46.5 | 33.3 | 22.1 |
| Δ-Clean | 7 5 | 0.3 | 1.2 | 47.7 | 23.4 | 16.8 | 43.2 | 35.3 | 22.1 | 46.1 | 33.0 | 22.1 |
| Δ-Robust | 0.3 | −0.6 | 0.8 | 22.0 | 13.3 | 10.2 | 12.6 | 8.7 | 7.8 | 25.2 | 15.6 | 14.1 |

TABLE 3

Evaluation of Average Precision for 2D object detection on the KITTI dataset under clean data and single-source adversarial perturbations on each modality.

| Fusion | Clean | | | Visual (RGB) Perturbation | | | Depth (Velo) Perturbation | | | Depth (Stereo) Perturbation | | |
|---|---|---|---|---|---|---|---|---|---|---|---|---|
| | Car | Pedest. | Cyclist | Car | Pedest. | Cyclist | Car | Pedest. | Cyclist | Car | Pedest. | Cyclist |
| Oracle (Upper Bound) | — | — | — | 90.4 | 80.1 | 86.4 | 93.2 | 79.3 | 85.3 | 92.8 | 80.5 | 87.4 |
| Concat Fusion | 93.5 | 81.5 | 87.7 | 14.3 | 10.7 | 12.3 | 1.58 | 11.1 | 8.82 | 3.57 | 4.64 | 7.23 |
| Mean Fusion | 93.6 | 77.7 | 86.7 | 12.6 | 15.2 | 10.5 | 3.16 | 12.9 | 7.88 | 3.08 | 8.03 | 7.77 |
| LEL + Robust | 71.4 | 64.2 | 80.0 | 3.95 | 15.4 | 13.9 | 6.83 | 20.6 | 24.8 | 9.39 | 24.2 | 24.7 |
| Gating + Robust | 89.4 | 74.7 | 84.6 | 57.2 | 54.2 | 56.0 | 46.5 | 45.7 | 45.6 | 41.6 | 47.4 | 48.8 |
| Ours | 90.6 | 79.9 | 85.4 | 85.1 | 73.9 | 82.3 | 87.8 | 71.1 | 85.8 | 89.8 | 76.8 | 84.7 |
| Δ-Clean | −3.0 | −1.6 | −2.3 | 70.8 | 58.7 | 70.0 | 74.6 | 58.2 | 77.0 | 86.2 | 68.8 | 76.9 |
| Δ-Robust | 1.2 | 5.2 | 0.8 | 27.9 | 19.7 | 26.3 | 41.3 | 25.4 | 40.2 | 48.2 | 29.4 | 35.9 |

Baselines

In addition to the approach presented in this disclosure, two types of methods were evaluated: standard multimodal models trained with clean data (standard training), and state-of-the-art robust multimodal models with robust training were evaluated with the following fusions.

Concatenation Fusion with Standard Training ("Concat Fusion"). The use of multimodal models with the same feature extractors and concatenate features before the final layers, which is a standard method for fusing features.

Mean Fusion with Standard Training ("Mean Fusion"). For each modality, train a unimodal model with the same feature extractor and final layers as the multimodal model on clean data. Then fuse the unimodal model outputs by taking their mean, i.e., $z_{output} = ^P i \in [k] Z_i$. For action recognition and sentiment analysis, perform mean fusion on the logits layer.

For object detection, perform the fusion prior to the YOLO layer. Mean fusion is a common fusion practice used in late fusion models, and in the context of defenses against perturbations, it is equivalent to a soft voting strategy between the different modalities.

Latent Ensembling Layer with Robust Training ("LEL+Robust"). This approach involves (1) training on clean data and data with each single-source corruption in an alternating fashion, and (2) ensembling the multimodal features using concatenation fusion followed by a linear network. The adaption of this strategy to the model presented in this disclosure by training these multimodal models with the LEL+Robust fusion layer on data augmented with single-source perturbations.

Information-Gated Fusion with Robust Training ("Gating+Robust"). This approach applies a multiplicative gating function to features from different modalities before ensembling them. The adaptive gating function is trained on clean data and data with single-source corruptions. The adaption of this robustness strategy to the model presented in this disclosure by training these multimodal models with their gated feature fusion layer on data augmented with single-source adversarial perturbations.

Upper Bound ("Oracle (Upper Bound)"). To obtain an empirical upper bound for robust performance under attacks against each modality, train and evaluate 2-modal models that exclude the perturbed modality. This model was referred to as the "Oracle" because it assumes perfect knowledge of which modality is attacked (i.e., a perfect odd-one-out network), which is not available in practice.

TABLE 4

Binary and seven-class classification results (%) on MOSI.

| Fusion | Clean | | Audio Perturbation | | Video Perturbation | | Text Perturbation | |
|---|---|---|---|---|---|---|---|---|
| | 2-class | 7-class | 2-class | 7-class | 2-class | 7-class | 2-class | 7-class |
| Oracle (Upper Bound) | — | — | 78.64 | 49.10 | 73.36 | 47.84 | 69.82 | 40.28 |
| Concat Fusion | 79.82 | 49.69 | 56.92 | 21.38 | 51.23 | 19.75 | 39.50 | 9.97 |
| Mean Fusion | 78.09 | 46.14 | 52.63 | 20.75 | 49.37 | 17.02 | 35.50 | 8.88 |
| LEL + Robust | 79.09 | 49.92 | 69.21 | 39.51 | 63.15 | 35.17 | 58.14 | 21.23 |
| Gating + Robust | 78.82 | 46.37 | 69.31 | 38.26 | 64.23 | 31.88 | 59.39 | 25.14 |
| Ours | 82.03 | 50.89 | 73.18 | 42.06 | 69.94 | 38.20 | 66.13 | 30.20 |
| Δ-Clean | 2.21 | 1.20 | 16.26 | 20.68 | 18.71 | 18.45 | 26.53 | 20.23 |
| Δ-Robust | 1.94 | 0.97 | 3.87 | 2.55 | 5.71 | 3.03 | 6.74 | 5.06 |

TABLE 5

Detection rate (%) of odd-one-out networks that use unaligned vs. aligned representations of features from each modality.

| | Action Recognition on EPIC-Kitchens | | | |
|---|---|---|---|---|
| Odd-one-out network | Clean | Visual Perturb | Motion Perturb | Audio Perturb |
| Unaligned features | 66.8 | 73.4 | 88.6 | 84.7 |
| Aligned Features | 55.9 | 54.7 | 41.3 | 52.8 |

TABLE 5-continued

Detection rate (%) of odd-one-out networks that use unaligned vs. aligned representations of features from each modality.

Object Detection on KITTI

| Odd-one-out network | Clean | RGB Perturb | Velo Perturb | Stereo Perturb |
|---|---|---|---|---|
| Unaligned features | 96.2 | 93.5 | 98.2 | 98.0 |
| Aligned Features | 91.9 | 86.8 | 94.4 | 90.4 |

Sentiment Analysis on MOSI

| Odd-one-out network | Clean | Audio Perturb | Video Perturb | Text Perturb |
|---|---|---|---|---|
| Unaligned features | 94.8 | 95.3 | 91.2 | 86.4 |
| Aligned Features | 80.3 | 90.4 | 87.3 | 78.5 |

TABLE 6

Number of parameters (in millions) in the feature extractors and fusion networks of out multimodal models.

| | # Parameters (Approx in Millions) | |
|---|---|---|
| Task | Feature Extractors (Not Trained) | Fusion Network (Trained) |
| EPIC-Kitchens | 30.8 | 57.9 |
| KITTI | 201.1 | 6.8 |
| CMU-MOSI | 253.4 | 12.3 |

FIGS. 11-16 illustrate exemplary embodiments however the concepts of this disclosure may be applied to additional embodiments. Some exemplary embodiments include: Industrial applications in which the modalities may include video, weight, IR, 3D camera, and sound; power tool or appliance applications in which the modalities may include torque, pressure, temperature, distance, or sound; medical applications in which the modalities may include ultrasound, video, CAT scan, MRI, or sound; robotic applications in which the modalities may include video, ultrasound, LIDAR, IR, or Sound; and security applications in which the modalities may include video, sound, IR, or LIDAR. The modalities may have diverse datasets for example, a video dataset may include an image, a LIDAR dataset may include a point cloud, and an microphone dataset may include a time series.

Figure 11:
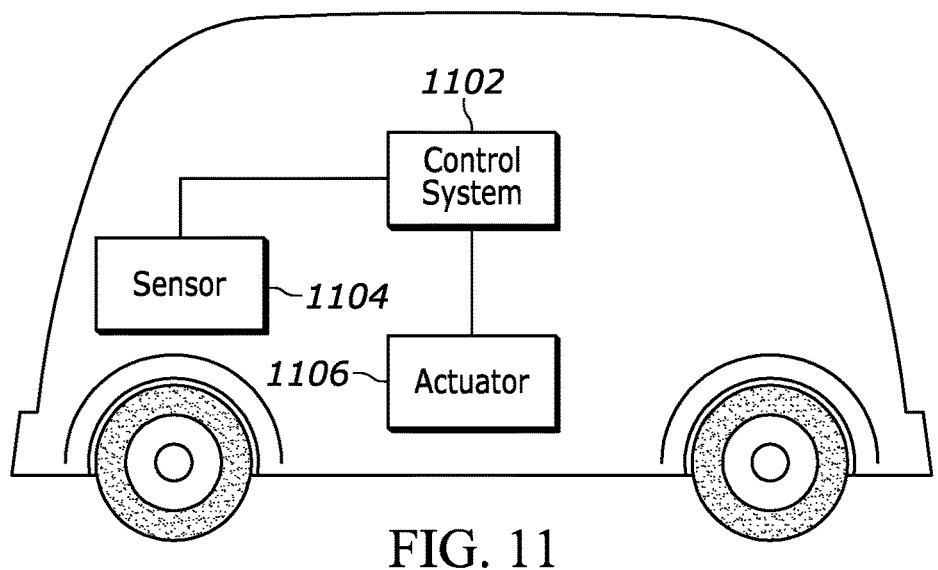
FIG. 11 is a schematic diagram of a control system configured to control a vehicle.

FIG. 11 is a schematic diagram of control system 1102 configured to control a vehicle, which may be an at least partially autonomous vehicle or an at least partially autonomous robot. The vehicle includes a sensor 1104 and an actuator 1106. The sensor 1104 may include one or more wave energy based sensor (e.g., a Charge Coupled Device CCD, or video), radar, LiDAR, microphone array, ultrasonic, infrared, thermal imaging, acoustic imaging or other technologies (e.g., positioning sensors such as GPS). One or more of the one or more specific sensors may be integrated into the vehicle. Alternatively or in addition to one or more specific sensors identified above, the control module 1102 may include a software module configured to, upon execution, determine a state of actuator 1104.

In embodiments in which the vehicle is an at least a partially autonomous vehicle, actuator 1106 may be embodied in a brake system, a propulsion system, an engine, a drivetrain, or a steering system of the vehicle. Actuator control commands may be determined such that actuator 1106 is controlled such that the vehicle avoids collisions with detected objects. Detected objects may also be classified according to what the classifier deems them most likely to be, such as pedestrians or trees. The actuator control commands may be determined depending on the classification. For example, control system 1102 may segment an image (e.g., optical, acoustic, thermal) or other input from sensor 1104 into one or more background classes and one or more object classes (e.g. pedestrians, bicycles, vehicles, trees, traffic signs, traffic lights, road debris, or construction barrels/cones, etc.), and send control commands to actuator 1106, in this case embodied in a brake system or propulsion system, to avoid collision with objects. In another example, control system 1102 may segment an image into one or more background classes and one or more marker classes (e.g., lane markings, guard rails, edge of a roadway, vehicle tracks, etc.), and send control commands to actuator 1106, here embodied in a steering system, to cause the vehicle to avoid crossing markers and remain in a lane. In a scenario where an adversarial attack may occur, the system described above may be further trained to better detect objects or identify a change in lighting conditions or an angle for a sensor or camera on the vehicle.

In other embodiments where vehicle 1100 is an at least partially autonomous robot, vehicle 1100 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 1106 may be determined such that a propulsion unit, steering unit and/or brake unit of the mobile robot may be controlled such that the mobile robot may avoid collisions with identified objects.

In another embodiment, vehicle 1100 is an at least partially autonomous robot in the form of a gardening robot. In such embodiment, vehicle 1100 may use an optical sensor as sensor 1104 to determine a state of plants in an environment proximate vehicle 1100. Actuator 1106 may be a nozzle configured to spray chemicals. Depending on an identified species and/or an identified state of the plants, actuator control command 1102 may be determined to cause actuator 1106 to spray the plants with a suitable quantity of suitable chemicals.

Vehicle 1100 may be an at least partially autonomous robot in the form of a domestic appliance. Non-limiting examples of domestic appliances include a washing machine, a stove, an oven, a microwave, or a dishwasher. In such a vehicle 1100, sensor 1104 may be an optical or acoustic sensor configured to detect a state of an object which is to undergo processing by the household appliance. For example, in the case of the domestic appliance being a washing machine, sensor 1104 may detect a state of the laundry inside the washing machine. Actuator control command may be determined based on the detected state of the laundry.

In this embodiment, the control system 1102 would receive image (optical or acoustic and annotation information from sensor 1104. Using these and a prescribed number of classes k and similarity measure $\overline{K}$ that are stored in the system, the control system 1102 may use the method described in FIG. 10 to classify each pixel of the image received from sensor 1104. Based on this classification, signals may be sent to actuator 1106, for example, to brake or turn to avoid collisions with pedestrians or trees, to steer to remain between detected lane markings, or any of the actions performed by the actuator 1106 as described above. Signals may also be sent to sensor 1104 based on this classification, for example, to focus or move a camera lens.

Figure 12:
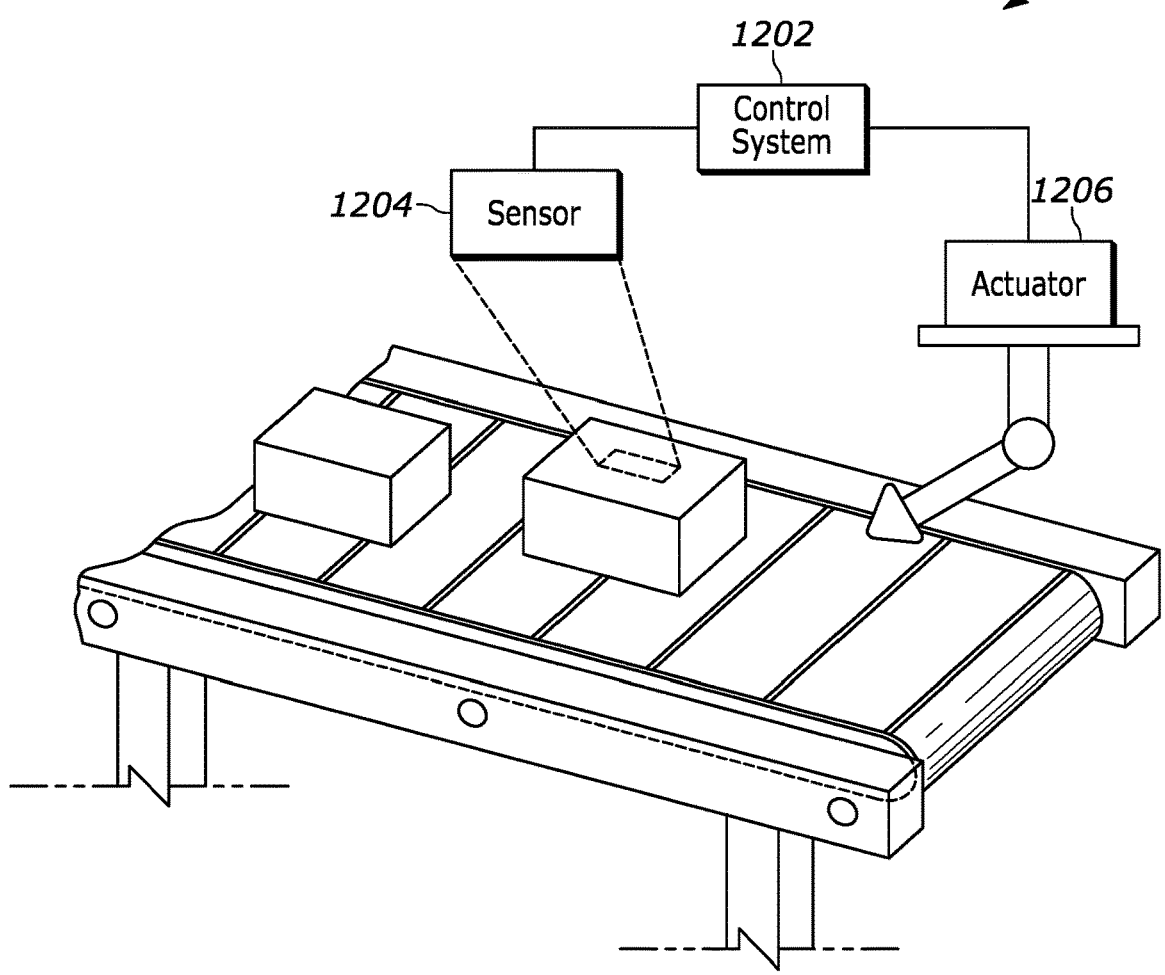
FIG. 12 is a schematic diagram of a control system configured to control a manufacturing machine.

FIG. 12 depicts a schematic diagram of control system 1202 configured to control system 1200 (e.g., manufacturing machine), such as a punch cutter, a cutter or a gun drill, of manufacturing system 102, such as part of a production line. Control system 1202 may be configured to control actuator 14, which is configured to control system 100 (e.g., manufacturing machine).

Sensor 1204 of system 1200 (e.g., manufacturing machine) may be an wave energy sensor such as an optical or acoustic sensor or sensor array configured to capture one or more properties of a manufactured product. Control system 1202 may be configured to determine a state of a manufactured product from one or more of the captured properties. Actuator 1206 may be configured to control system 1202 (e.g., manufacturing machine) depending on the determined state of manufactured product 104 for a subsequent manufacturing step of the manufactured product. The actuator 1206 may be configured to control functions of FIG. 11 (e.g., manufacturing machine) on subsequent manufactured products of the system (e.g., manufacturing machine) depending on the determined state of the previous manufactured product.

In this embodiment, the control system 1202 would receive image (e.g., optical or acoustic) and annotation information from sensor 1204. Using these and a prescribed number of classes k and similarity measure $\overline{K}$ that are stored in the system, the control system 1202 may use the method described in FIG. 10 to classify each pixel of the image received from sensor 1204, for example, to segment an image of a manufactured object into two or more classes, to detect anomalies in the manufactured product, to ensure the presence of objects on the manufactured product such as barcodes. Based on this classification, signals may be sent to actuator 1206. For example, if control system 1202 detects anomalies in a product, actuator 1206 may mark or remove anomalous or defective products from the line. In another example, if control system 1202 detects the presence of barcodes or other objects to be placed on the product, actuator 1106 may apply these objects or remove them. Signals may also be sent to sensor 1204 based on this classification, for example, to focus or move a camera lens.

Figure 13:
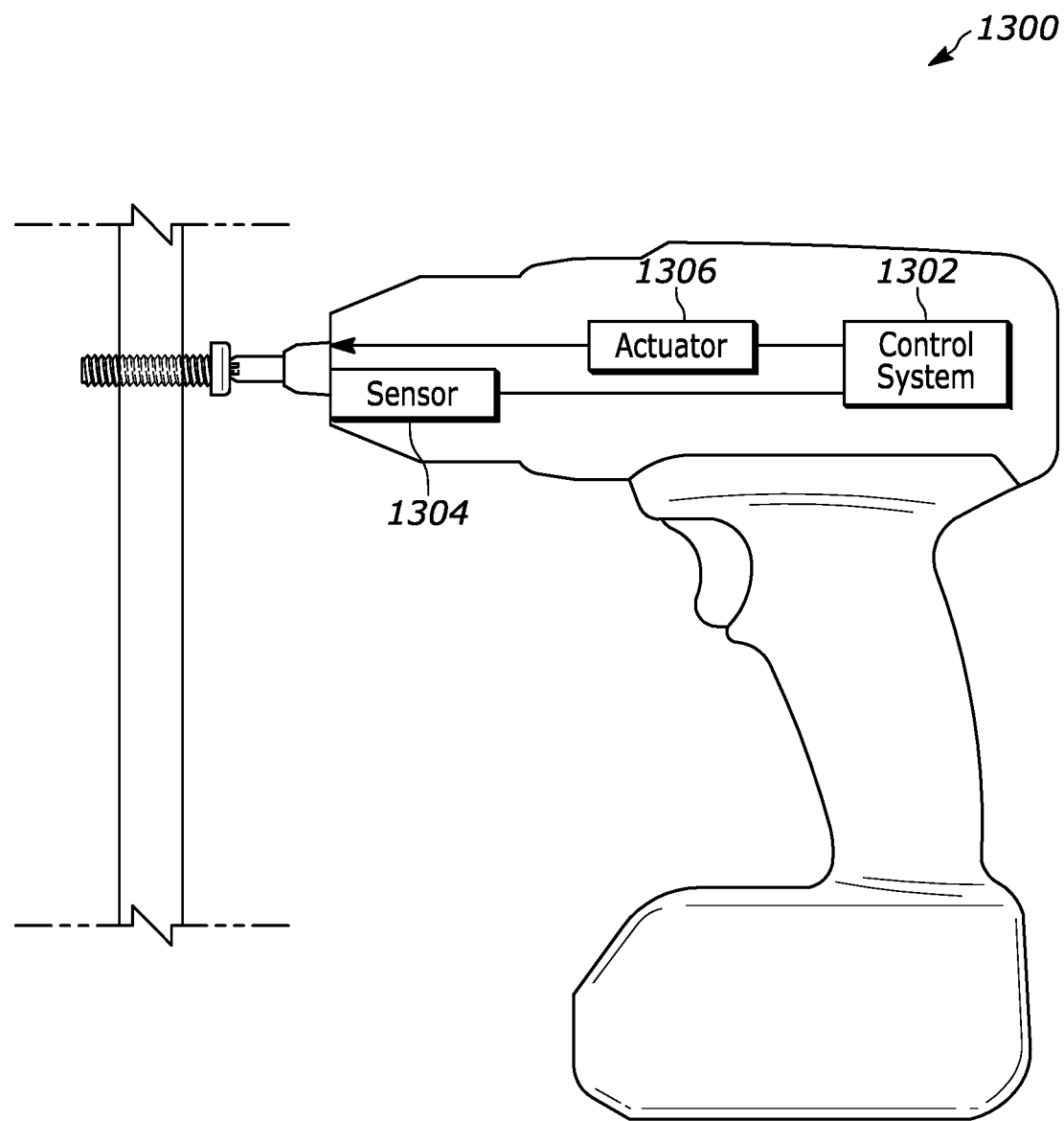
FIG. 13 is a schematic diagram of a control system configured to control a power tool.

FIG. 13 depicts a schematic diagram of control system 1302 configured to control power tool 1300, such as a power drill or driver, that has an at least partially autonomous mode. Control system 1302 may be configured to control actuator 1306, which is configured to control power tool 1300.

Sensor 1304 of power tool 1300 may be a wave energy sensor such as an optical or acoustic sensor configured to capture one or more properties of a work surface and/or fastener being driven into the work surface. Control system 1302 may be configured to determine a state of work surface and/or fastener relative to the work surface from one or more of the captured properties.

In this embodiment, the control system 1302 would receive image (e.g., optical or acoustic) and annotation information from sensor 1304. Using these and a prescribed number of classes k and similarity measure $\overline{K}$ that are stored in the system, the control system 1302 may use the method described in FIG. 10 to classify each pixel of the image received from sensor 1304 in order to segment an image of a work surface or fastener into two or more classes or to detect anomalies in the work surface or fastener. Based on this classification, signals may be sent to actuator 1306, for example to the pressure or speed of the tool, or any of the actions performed by the actuator 1306 as described in the above sections. Signals may also be sent to sensor 1304 based on this classification, for example, to focus or move a camera lens. In another example, the image may be a time series image of signals from the power tool 1300 such as pressure, torque, revolutions per minute, temperature, current, etc. in which the power tool is a hammer drill, drill, hammer (rotary or demolition), impact driver, reciprocating saw, oscillating multi-tool, and the power tool is either cordless or corded.

Figure 14:
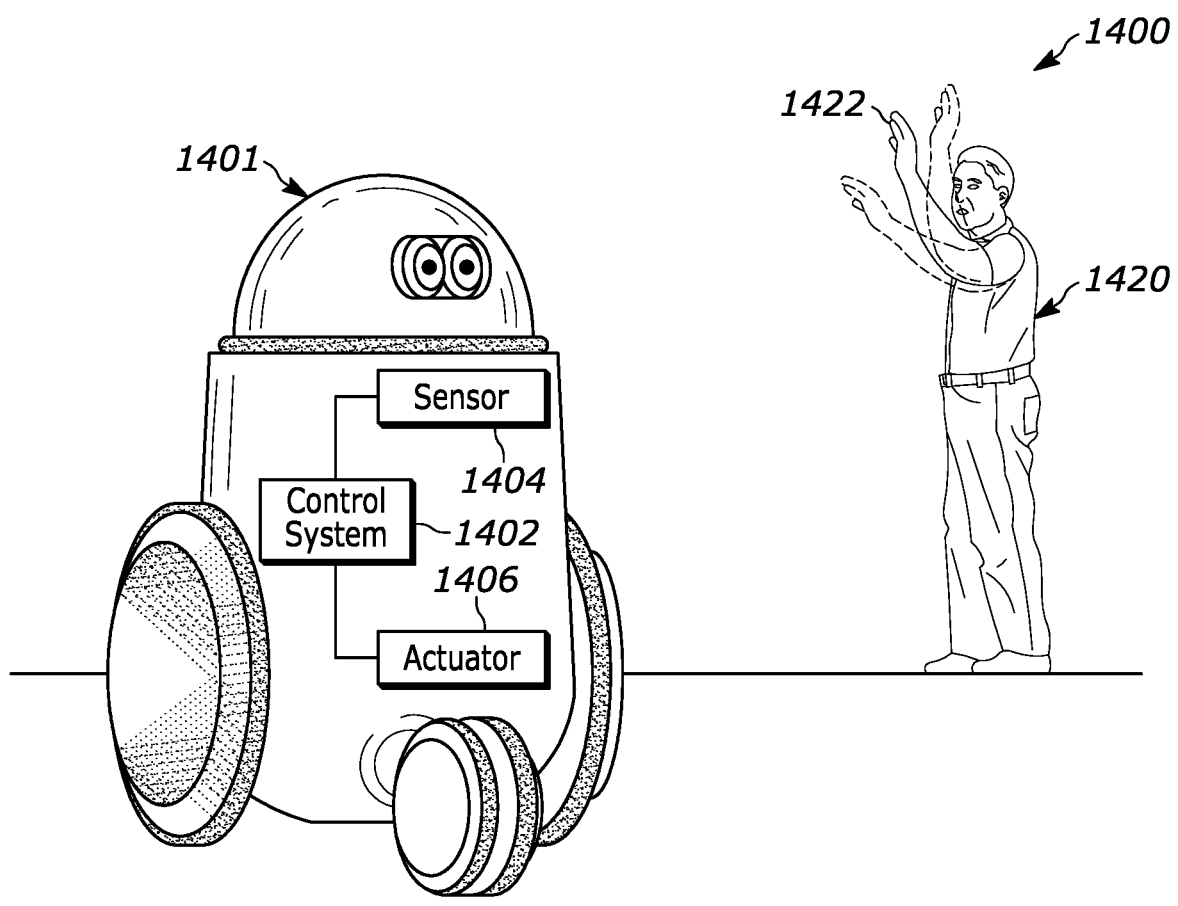
FIG. 14 is a schematic diagram of a control system configured to control an automated personal assistant.

FIG. 14 depicts a schematic diagram of control system 1402 configured to control automated personal assistant 1401. Control system 1402 may be configured to control actuator 1406, which is configured to control automated personal assistant 1401. Automated personal assistant 1401 may be configured to control a domestic appliance, such as a washing machine, a stove, an oven, a microwave or a dishwasher.

In this embodiment, the control system 1402 would receive image (e.g., optical or acoustic) and annotation information from sensor 1404. Using these and a prescribed number of classes k and similarity measure $\overline{K}$ that are stored in the system, the control system 1402 may use the method described in FIG. 10 to classify each pixel of the image received from sensor 1404, for example, to segment an image of an appliance or other object to manipulate or operate. Based on this classification, signals may be sent to actuator 1406, for example, to control moving parts of automated personal assistant 1401 to interact with domestic appliances, or any of the actions performed by the actuator 1406 as described in the above sections. Signals may also be sent to sensor 1404 based on this classification, for example, to focus or move a camera lens.

Figure 15:
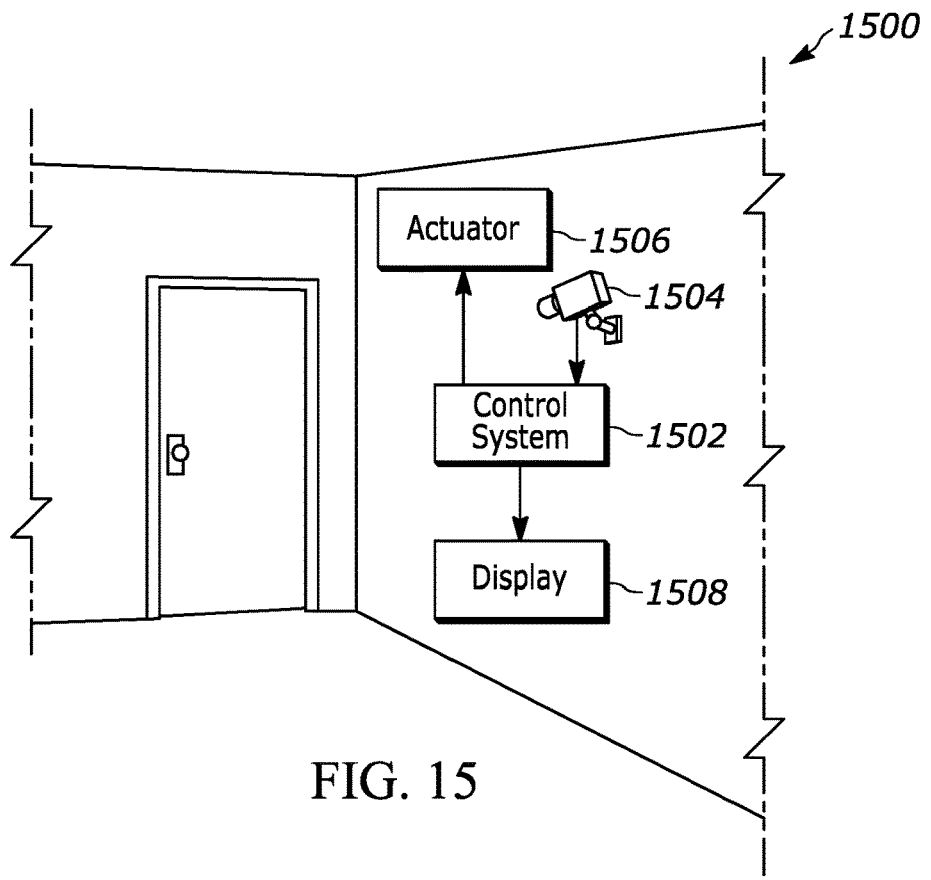
FIG. 15 is a schematic diagram of a control system configured to control a monitoring system.

FIG. 15 depicts a schematic diagram of control system 1502 configured to control monitoring system 1500. Monitoring system 1500 may be configured to physically control access through door 252. Sensor 1504 may be configured to detect a scene that is relevant in deciding whether access is granted. Sensor 1504 may be an optical or acoustic sensor or sensor array configured to generate and transmit image and/or video data. Such data may be used by control system 1502 to detect a person's face.

Monitoring system 1500 may also be a surveillance system. In such an embodiment, sensor 1504 may be a wave energy sensor such as an optical sensor, infrared sensor, acoustic sensor configured to detect a scene that is under surveillance and control system 1502 is configured to control display 1508. Control system 1502 is configured to determine a classification of a scene, e.g. whether the scene detected by sensor 1504 is suspicious. A perturbation object may be utilized for detecting certain types of objects to allow the system to identify such objects in non-optimal conditions (e.g., night, fog, rainy, interfering background noise etc). Control system 1502 is configured to transmit an actuator control command to display 1508 in response to the classification. Display 1508 may be configured to adjust the displayed content in response to the actuator control command. For instance, display 1508 may highlight an object that is deemed suspicious by controller 1502.

In this embodiment, the control system 1502 would receive image (optical or acoustic) and annotation information from sensor 1504. Using these and a prescribed number of classes k and similarity measure $\overline{K}$ that are stored in the system, the control system 1502 may use the method described in FIG. 10 to classify each pixel of the image received from sensor 1504 in order to, for example, detect the presence of suspicious or undesirable objects in the scene, to detect types of lighting or viewing conditions, or to detect movement. Based on this classification, signals may be sent to actuator 1506, for example, to lock or unlock doors or other entryways, to activate an alarm or other signal, or any of the actions performed by the actuator 1506 as described in the above sections. Signals may also be sent to sensor 1504 based on this classification, for example, to focus or move a camera lens.

Figure 16:
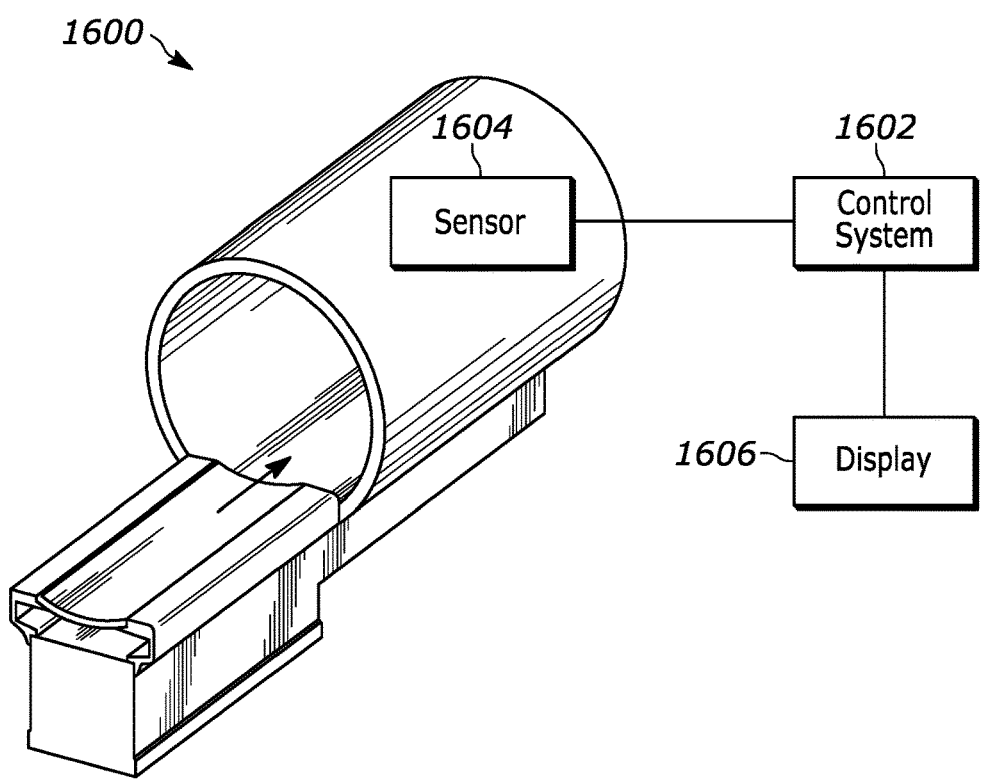
FIG. 16 is a schematic diagram of a control system configured to control a medical imaging system.

FIG. 16 depicts a schematic diagram of control system 1602 configured to control imaging system 1600, for example an MRI apparatus, x-ray imaging apparatus or ultrasonic apparatus. Sensor 1604 may, for example, be an imaging sensor or acoustic sensor array. Control system 1602 may be configured to determine a classification of all or part of the sensed image. Control system 1602 may be configured to determine or select an actuator control command in response to the classification obtained by the trained neural network. For example, control system 1602 may interpret a region of a sensed image (optical or acoustic) to be potentially anomalous. In this case, the actuator control command may be determined or selected to cause display 1606 to display the imaging and highlighting the potentially anomalous region.

In this embodiment, the control system 1602 would receive image and annotation information from sensor 1604. Using these and a prescribed number of classes k and similarity measure $\overline{K}$ that are stored in the system, the control system 1602 may use the method described in FIG. 10 to classify each pixel of the image received from sensor 1604. Based on this classification, signals may be sent to actuator 1606, for example, to detect anomalous regions of the image or any of the actions performed by the actuator 1606 as described in the above sections.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A multimodal perception system comprising:
a controller configured to,
receive a first signal from a first sensor, a second signal from a second sensor, and a third signal from a third sensor,
extract a first feature vector from the first signal,
extract a second feature vector from the second signal,
extract a third feature vector from the third signal,
determine an odd-one-out vector from the first, second, and third feature vectors via an odd-one-out network of a machine learning network, based on inconsistent modality prediction,
fuse, via a fusion network, the first, second, and third feature vectors and odd-one-out vector into a fused feature vector, and
output the fused feature vector.

2. The multimodal perception system of claim 1, wherein the first sensor, second sensor, and third sensor are each of a different modality.

3. The multimodal perception system of claim 2, wherein the odd-one-out vector is of length modalities plus 1, and each modality has a perturbation with the plus 1 being indicative of an unperturbed modality.

4. The multimodal perception system of claim 3, wherein the controller determines the odd-one-out network and fuses the feature vectors with the odd-one-out vector as a Convolutional Neural Networks (CNN) to align spatiotemporal dimensions of the different modalities.

5. The multimodal perception system of claim 1, wherein the controller is further configures to extract the first feature vectors from the first signal, via a first pre-trained AI model, extract the second feature vectors from the second signal, via a second pre-trained AI model, extract the third feature vectors from the third signal, via a third pre-trained AI model.

6. The multimodal perception system of claim 5, wherein the controller is further configured to jointly train the odd-one-out network according to a loss function expressed by $$-\mathbb{E}_{\substack{(x,y)\sim\mathcal{D} \\ z_i=g_i(x_i)}}\left[\log o(z)_{k+1} + \sum_{i=1}^{k}\log o(z_i^*, z_{-i})_i\right],$$

in parallel with a task modality, in which $z^*_i=g_i(x^*_i)$ is a feature extracted from perturbed input$^{x^*i}$, and o is the odd-one-out network, and in response to a stopping criteria event, halt the joint training.

7. The multimodal perception system of claim 1, wherein the controller is further configures to fuse the first, second, and third feature vectors and out-one-out vector into a fused feature vector according to $$e_i(z)=NN(\oplus z_{-i})\forall_i\in[k], e_{k+1}(z)=NN(\oplus z),$$

in which $\oplus$ denotes a concatenation operation, NN stands for a shallow neural network, z is input, k is a modality, $e_i$ is a fusion of features from all the modalities except for i, and only $e_{k+1}$ fuses features from all the modalities.

8. The multimodal perception system of claim 1, wherein the first sensor is one of video, RADAR, LIDAR, or ultrasound, and the controller is further configured to control an autonomous vehicle based on the fused feature vector.

9. The multimodal perception system of claim 1, wherein the first sensor is one of video, sound, IR, or LIDAR, and the controller is further configured to control an access door based on the fused feature vector.

10. The multimodal perception system of claim 1, wherein the first sensor is one of video, sound, ultrasound, IR, or LIDAR, and the controller is further configured to control a mechanical system.

11. A multimodal perception method comprising:
receiving a first signal from a first sensor, a second signal from a second sensor, and a third signal from a third sensor;
extracting a first feature vectors from the first signal, a second feature vectors from the second signal, and a third feature vectors from the third signal;
determining an odd-one-out, vector from the first, second, and third feature vectors via an odd-one-out network of a machine learning network based on an inconsistent modality prediction;
fusing, via a fusion network, the first, second, and third feature vectors and odd-one-out vector into a fused feature vector; and
outputting the fused feature vector.

12. The multimodal perception method of claim 11 wherein the first sensor, second sensor, and third sensor are each of a different modality.

13. The multimodal perception method of claim 12, wherein the odd-one-out vector is of length modalities plus 1, and each modality has a perturbation with the plus 1 being indicative of an unperturbed modality.

14. The multimodal perception method of claim 13, wherein determining the odd-one-out network and fusing the feature vectors with the odd-one-out vector is via a Convolutional Neural Networks (CNN) to align spatiotemporal dimensions of the different modalities.

15. The multimodal perception method of claim 11, wherein extracting the first feature vectors from the first signal, via a first pre-trained AI model, extracting the second feature vectors from the second signal, via a second pre-trained AI model, extracting the third feature vectors from the third signal, via a third pre-trained AI model.

16. The multimodal perception method of claim 15 further comprising, jointly training the odd-one-out network according to a loss function expressed by $$-\mathbb{E}_{\substack{(x,y)\sim\mathcal{D} \\ z_i=g_i(x_i)}}\left[\log o(z)_{k+1} + \sum_{i=1}^{k}\log o(z_i^*, z_{-i})_i\right],$$

in parallel with a task modality, in which $z^*_i=g_i(x^*_i)$ is a feature extracted from perturbed input$^{x^*i}$, and o is the odd-one-out network, and in response to a stopping criteria event, halt the joint training.

17. The multimodal perception method of claim 11, wherein fusing the first, second, and third feature vectors and out-one-out vector into a fused feature vector according to $$e_i(z)=NN(\oplus z_{-i})\forall_i\in[k], e_{k+1}(z)=NN(\oplus z),$$

in which $\oplus$ denotes a concatenation operation, NN stands for a shallow neural network, z is input, k is a modality, $e_i$ is a fusion of features from all the modalities except for i, and only $e_{k+1}$ fuses features from all the modalities.

18. A multimodal perception system for an autonomous vehicle comprising:
a first sensor that is one of a video, RADAR, LIDAR, or ultrasound sensor; and
a controller configured to,
receive a first signal from a first sensor, a second signal from a second sensor, and a third signal from a third sensor,
extract a first feature vector from the first signal,
extract a second feature vector from the second signal,
extract a third feature vector from the third signal,
determine an odd-one-out vector from the first, second, and third feature vectors via an odd-one-out network of a machine learning network, based on inconsistent modality prediction,
fuse, via a fusion network, the first, second, and third feature vectors and odd-one-out vector into a fused feature vector,
output the fused feature vector, and
control the autonomous vehicle based on the fused feature vector.

19. The multimodal perception system of claim 18, wherein the first sensor, second sensor, and third sensor are each of a different modality, and wherein the odd-one-out vector is of length modalities plus 1, and each modality has a perturbation with the plus 1 being indicative of an unperturbed modality.

20. The multimodal perception system of claim 19, wherein the controller determines the odd-one-out network and fuses the feature vectors with the odd-one-out vector as a Convolutional Neural Networks (CNN) to align spatiotemporal dimensions of the different modalities.

* * * * *